(12) United States Patent
Amansahedov

(10) Patent No.: US 10,298,685 B1
(45) Date of Patent: May 21, 2019

(54) ORGANIZING, SYNCHRONIZING, AND SHARING CUMULATIVE CONTACT INFORMATION

(71) Applicant: Myrat Amansahedov, Bielany Wroclawskie (PL)

(72) Inventor: Myrat Amansahedov, Bielany Wroclawskie (PL)

( * ) Notice: Subject to any disclaimer, the term of this patent is extended or adjusted under 35 U.S.C. 154(b) by 142 days.

(21) Appl. No.: 15/630,684

(22) Filed: Jun. 22, 2017

Related U.S. Application Data

(60) Provisional application No. 62/355,244, filed on Jun. 27, 2016.

(51) Int. Cl.
*H04L 29/08* (2006.01)
*H04L 29/12* (2006.01)
*H04M 1/2745* (2006.01)

(52) U.S. Cl.
CPC ...... *H04L 67/1095* (2013.01); *H04L 61/1594* (2013.01); *H04M 1/274508* (2013.01); *H04M 1/274516* (2013.01); *H04M 2242/12* (2013.01)

(58) Field of Classification Search
None
See application file for complete search history.

(56) References Cited

U.S. PATENT DOCUMENTS

| | | | | |
|---|---|---|---|---|
| 2008/0205655 A1* | 8/2008 | Wilkins | ............... | G06Q 10/10 380/279 |
| 2009/0240657 A1* | 9/2009 | Grigsby | ............... | G06Q 10/10 |
| 2009/0313299 A1* | 12/2009 | Bonev | ............... | G06Q 10/109 |
| 2011/0082896 A1* | 4/2011 | Kumar | ............... | H04M 3/4931 709/202 |
| 2011/0238766 A1* | 9/2011 | Lew | ............... | H04L 29/12896 709/206 |
| 2013/0275883 A1* | 10/2013 | Bharshankar | ............ | H04L 67/22 715/753 |

* cited by examiner

*Primary Examiner* — Philip J Chea
*Assistant Examiner* — Hassan A Khan
(74) *Attorney, Agent, or Firm* — Plager Schack LLP; Mark H. Plager; Stephen Hallberg

(57) ABSTRACT

A system and a method for organizing, synchronizing, and sharing cumulative contact information are disclosed, along with a method for combining and updating contact profiles by linking personal and corporate or group IDs. The system and the method revolutionize and simplify the way people share and update contact information because each user updates only the contact information of the user himself or herself. Then the information is automatically synced and updated with other users (with whom the contact information was initially set to be shared).

10 Claims, 23 Drawing Sheets

700 ⟶

```
GF_1 = {FIRST_NAME, SURNAME} BASIC INFORMATION
GF_2 = {FIRST_NAME, SURNAME, ADDRESS, E-MAIL} COMPLETE INFORMATION
GF_3 = {FIRST_NAME, E-MAIL} QUICK CONTACT
...
GF_K = {...} OTHER_FIELDS_GROUPS
```

```
GF = {"BASIC INFORMATION", "COMPLETE INFORMATION",
      "QUICK_CONTACT",..., GF_K}
```

FIG.8

| FIELD ID | DEFAULT VALUE | VALUE IN LANGUAGE $L_1$ | VALUE IN LANGUAGE $L_2$ | ... | VALUE IN LANGUAGE $L_N$ |
|---|---|---|---|---|---|
| 1210<br>AF_1 | 1212<br>AF_1_DEF | 1214<br>AF_1_L_1 | 1216<br>AF_1_L_2 | ... | 1218<br>AF_1_L_N |
| 1220<br>AF_2 | 1222<br>AF_2_DEF | 1224<br>AF_2_L_1 | 1226<br>AF_2_L_2 | ... | 1228<br>AF_2_L_N |
| 1230<br>AF_3 | 1232<br>AF_3_DEF | 1234<br>AF_3_L_1 | 1236<br>AF_3_L_2 | ... | 1238<br>AF_3_L_N |
| ... | ... | ... | ... | ... | ... |
| 1240<br>AF_N | 1242<br>AF_N_DEF | 1244<br>AF_N_L_1 | 1246<br>AF_N_L_2 | ... | 1248<br>AF_N_L_N |

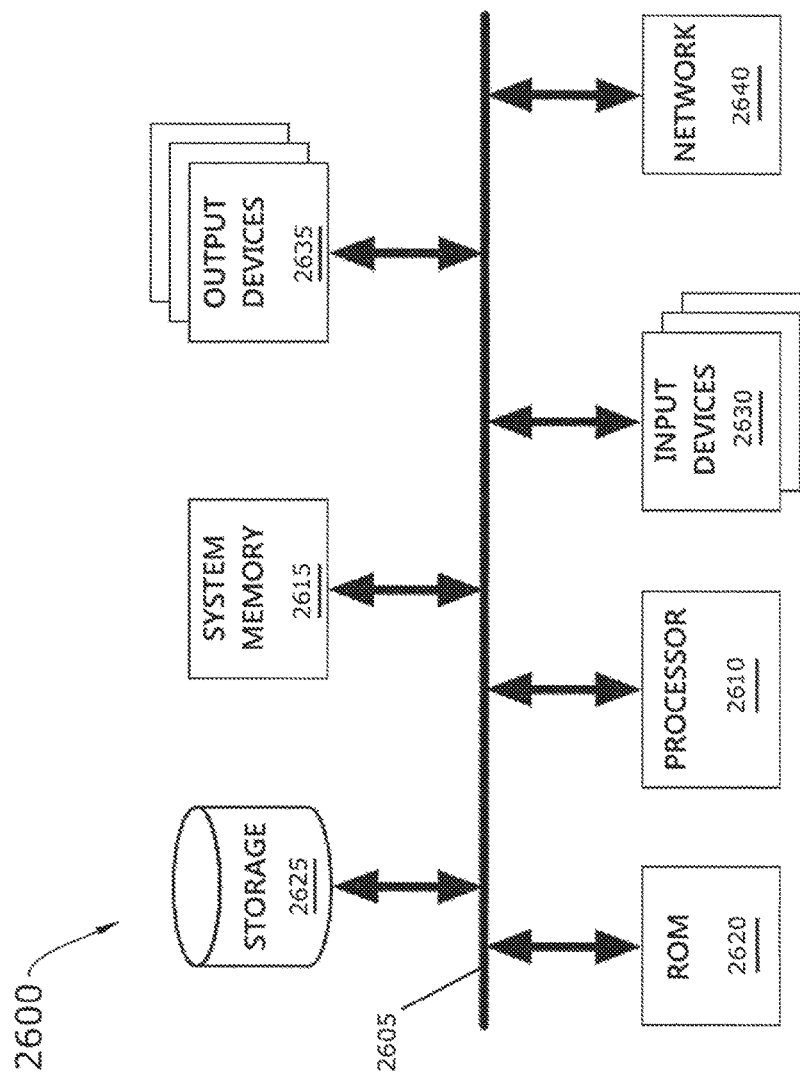

ORGANIZING, SYNCHRONIZING, AND SHARING CUMULATIVE CONTACT INFORMATION

CLAIM OF BENEFIT TO PRIOR APPLICATION

This application claims benefit to U.S. Patent Application No. 62/355,244, filed Jun. 27, 2016, the entire contents of which is herein incorporated by reference.

BACKGROUND

Embodiments of the invention described in this specification relate generally to contact information organizing and sharing, and more particularly, to organizing, synchronizing, and sharing cumulative contact information.

Contact information is useful in a variety of applications, such as voice, text, scheduling, etc. Typically, a person maintains a list of contacts and retrieves each contact profile as needed (e.g., to make a call, to send a text message, to schedule an event or meeting, etc.). However, managing contacts is a challenge, especially when contact profiles typically increase in scope (e.g., name, address, primary phone, work phone, other phone, primary email, secondary email, etc.) as time goes on, and when the number of contacts a person knows tends to increase over time. Managing the contacts becomes a nightmare when information is missed (e.g., a contact moved, resulting in an updated address, and possibly updated phone number(s) and/or email address, etc.).

In addition, the number of mobile devices and other electronic devices available in the market, and the number of mobile devices and other electronic devices that individuals use, have increased dramatically over recent decades. In view of the proliferation of mobile devices used by people (or "users") at work, in personal scenarios, between family members, etc., the possibility of having redundant contact information or duplicated contacts is ever-present. This is a problem for most users who rely on manual updating of contact information. For instance, when a user ("User 1") interacts with another user ("User 2"), either User 1 or User 2 (or both) may relay updated contact information or provide contact details of another mutually related person. However, it is typically not the case that either User 1 or User 2 will have all of their mobile devices or electronic devices at their behest. As a result, any manual update that occurs will need to be replicated later on other devices. Yet this typically does not occur, for various reasons (forgetting, unable to find other devices, etc.). Thus, there are some devices that have a contact with a set of contact details, while other devices may (or may not) have the same contact, but have only a limited subset of the contact details.

Currently available systems involve manually updating each contact's information field. Such methods are very time consuming and still not always accurate, virtually leaving very little room for keeping everyone's contact information up to date.

Therefore, what is needed is a way to organize, synchronize, and share cumulative contact information between computing devices of several users, where such computing devices include traditional computing devices, such as desktop and laptop computers which may include wired or wireless network interfaces for synchronizing contact information, and mobile devices with wireless network interfaces, such as mobile phones, smartphones, tablets, personal digital assistants (PDAs), and other such electronic devices in which local persistent storage devices or memory units store contact details of different people.

BRIEF DESCRIPTION

A cumulative contact information organizing, synchronizing, and sharing system, a method for organizing, synchronizing, and sharing cumulative contact information, and a method for compiling contact information by joining contact identifiers are disclosed.

In some embodiments, the cumulative contact information organizing, synchronizing, and sharing system is based on self-updating of contact information by each user. That is, each user only updates strictly his or her own contact information. In some embodiments, the self-updated contact information of all users is automatically synchronized across a plurality of contact information data sources, devices, and persistent data repositories within the cumulative contact information organizing, synchronizing, and sharing system. In this way, the cumulative contact information organizing, synchronizing, and sharing system makes all synchronized self-updated contact information available for other users (with whom the contact information was initially set to be shared).

In some embodiments, the method for organizing, synchronizing, and sharing cumulative contact information includes several steps that facilitate self-updating of contact information by each user. In some embodiments, the method for organizing, synchronizing, and sharing cumulative contact information constrains self-updating of contact information by a particular user to enable updates of the particular user's own contact information only. In some embodiments, the method for organizing, synchronizing, and sharing cumulative contact information includes several steps for automatically synchronizing the self-updated contact information of all users. In some embodiments, the method for organizing, synchronizing, and sharing cumulative contact information includes several steps which then make all synchronized self-updated contact information available for other users (with whom the contact information was initially set to be shared).

In some embodiments, the method for compiling contact information by joining contact identifiers includes several steps that purge duplicate contacts and redundant contact entries. In some embodiments, the method for compiling contact information by joining contact identifiers includes several steps that correct improperly entered contact information.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having thus described the invention in general terms, reference is now made to the accompanying drawings, which are not necessarily drawn to scale, and which show different views of two different exemplary mobile devices, labeled and referred to as DevA (device A) and DevB (device B), where such descriptions exemplify embodiments of the system and the method for organizing, synchronizing, and sharing cumulative contact information.

Figure 1:
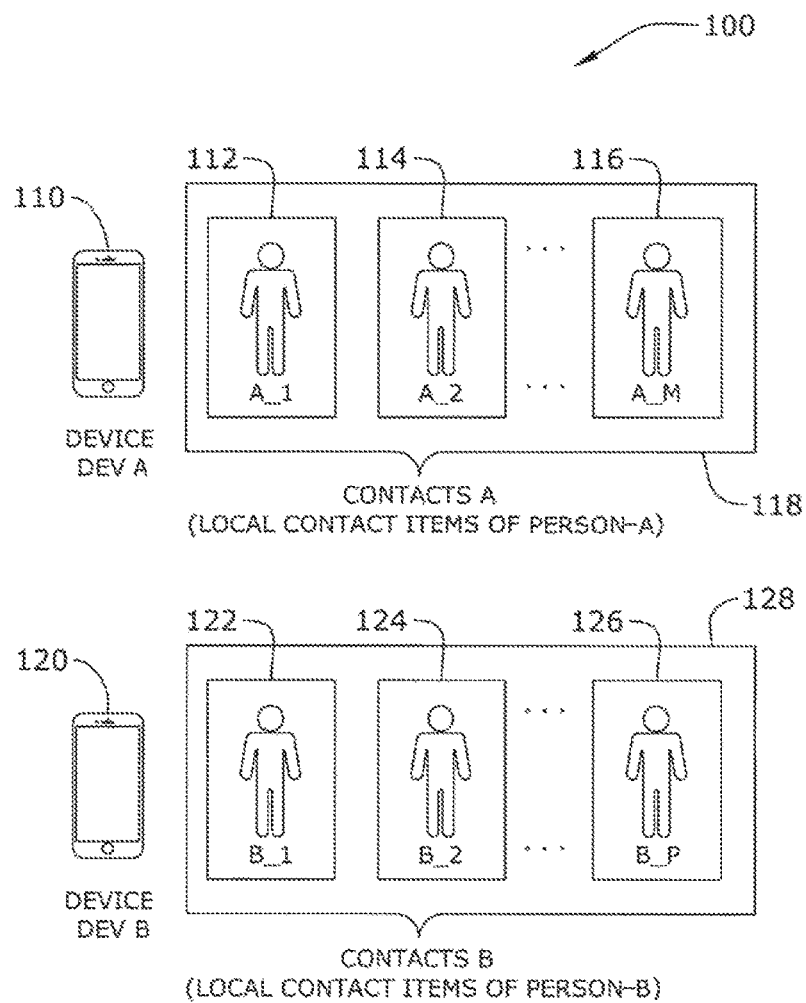

FIG. 1 conceptually illustrates an example of local contacts including PersonA local contacts on a first device A (DevA) and PersonB local contacts on a second device B (DevB), where the data format of the contacts are strings whose elements are numbered from 1 to N.

Figure 2:
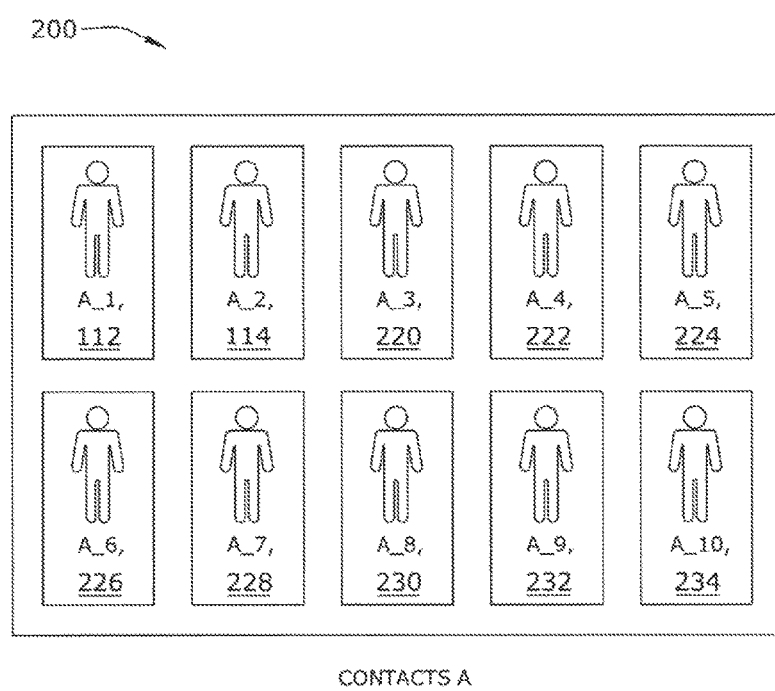

FIG. 2 conceptually illustrates a ten element set of local PersonA contacts on the device A (DevA), with the ten elements given IDs of A_1 to A_10.

Figure 3:

FIG. 3 conceptually illustrates an example of contact group assignments.

Figure 4:
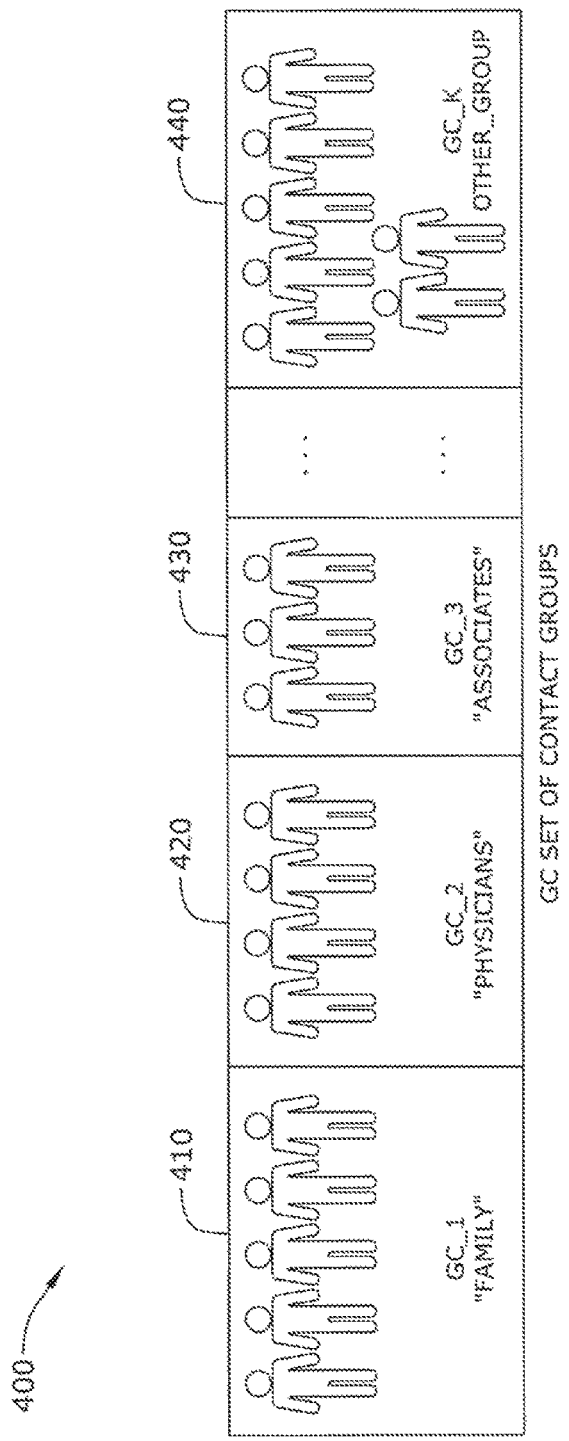

FIG. 4 conceptually illustrates a set of contact group assignments with the contacts in each group visually appearing as icons.

Figure 5:
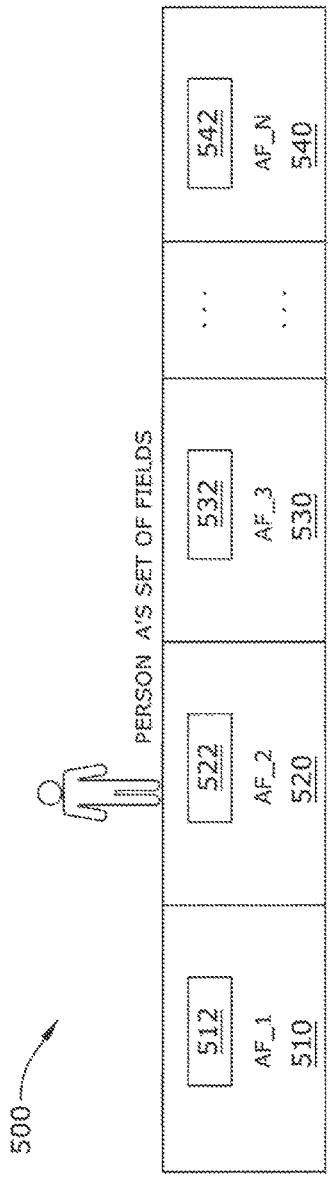

FIG. 5 conceptually illustrates a set of PersonA contact fields as a series whose elements are numbered from 1 to N (i.e., AF_1 to AF_N).

Figure 6:
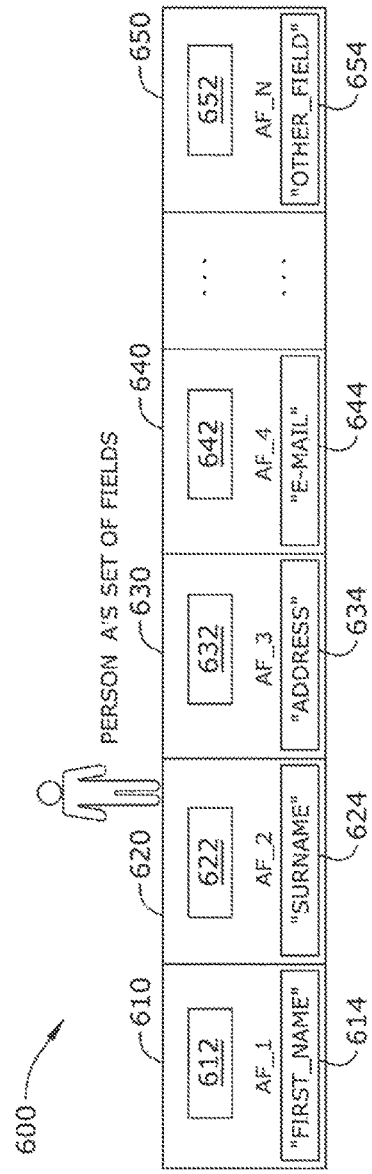

FIG. 6 conceptually illustrates an example of field types for PersonA's contact fields.

FIG. 7 conceptually illustrates an example of contact field grouping into functional contact field groups.

FIG. 8 conceptually illustrates a super group GF of the functional contact field groups shown in FIG. 7.

Figure 9:
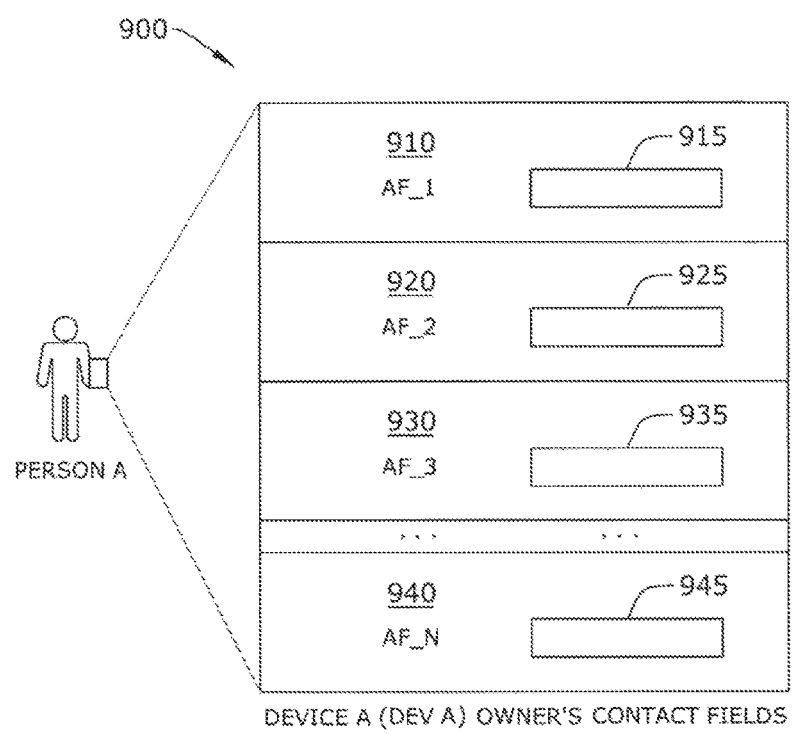

FIG. 9 conceptually illustrates a set of contact fields that PersonA has set on device A (DevA) in some embodiments.

Figures 10, 11:
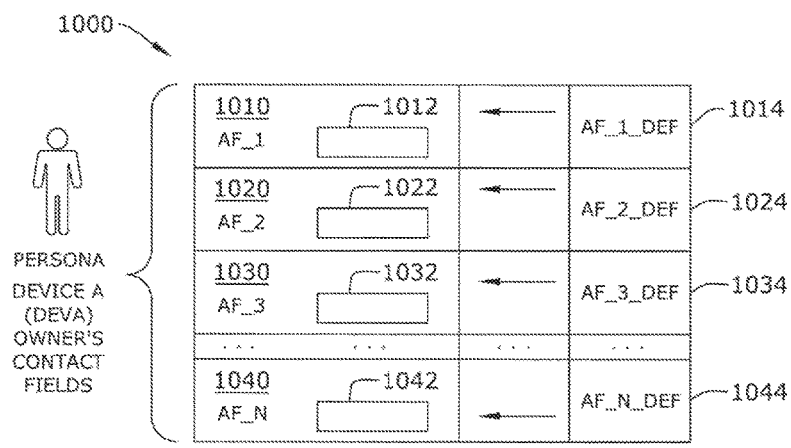

FIG. 10 conceptually illustrates the assignment of default values AF_1_def to AF_N_def to the fields within the fields' series of AF_1 to AF_N as shown in FIG. 9.

FIG. 11 conceptually illustrates the setting of default values to PersonA's contact fields by assigning specific text values to different types of fields.

FIG. 12 conceptually illustrates a two-dimensional matrix, which is created by the assignment to the PersonA's subsequent contact fields (AF_1 to AF_N) of default values and other values, being translations of these default fields into other languages ($L_1$ to $L_n$).

Figure 13:
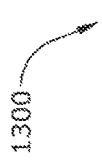

FIG. 13 conceptually illustrates an example of the two-dimensional matrix shown in FIG. 12 including default values entered by PersonA and selected fields' translations as shown in FIG. 11 to other exemplary languages.

Figure 14:
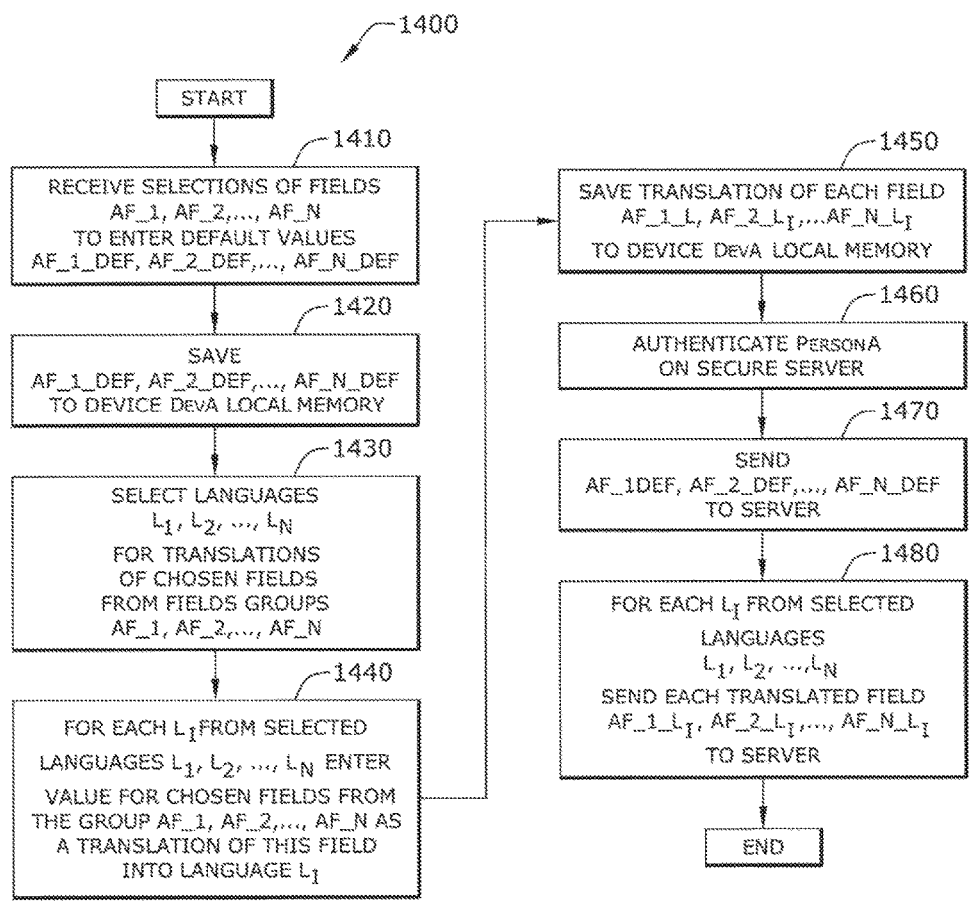

FIG. 14 conceptually illustrates a process for entering contact fields content translations into other languages than the default language of the user in some embodiments.

Figure 15A:
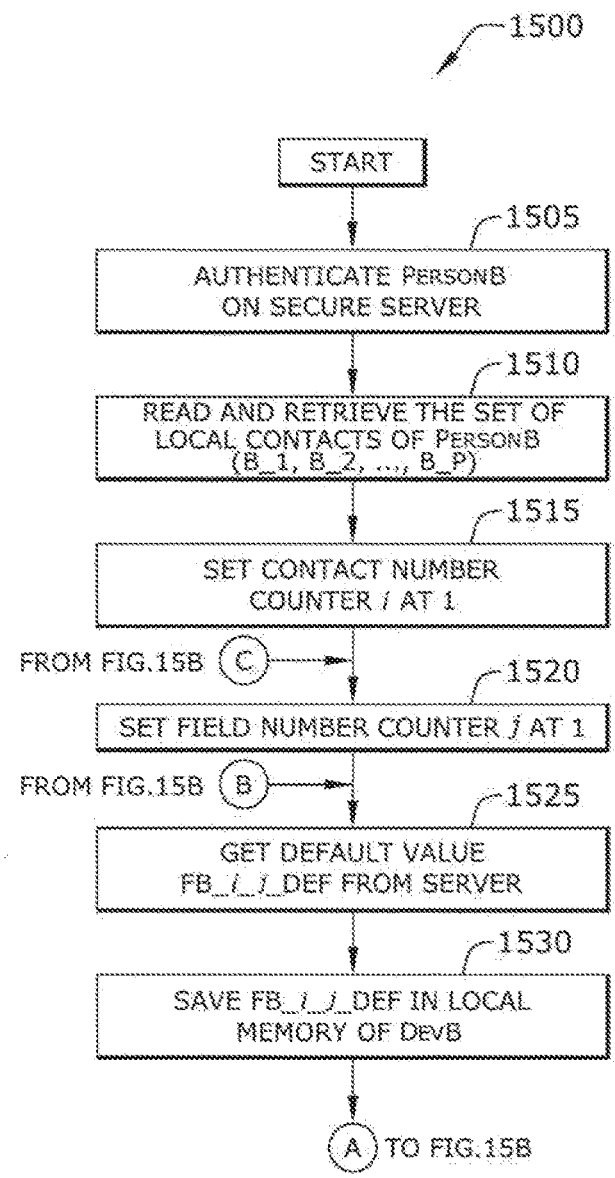
Figure 15B:
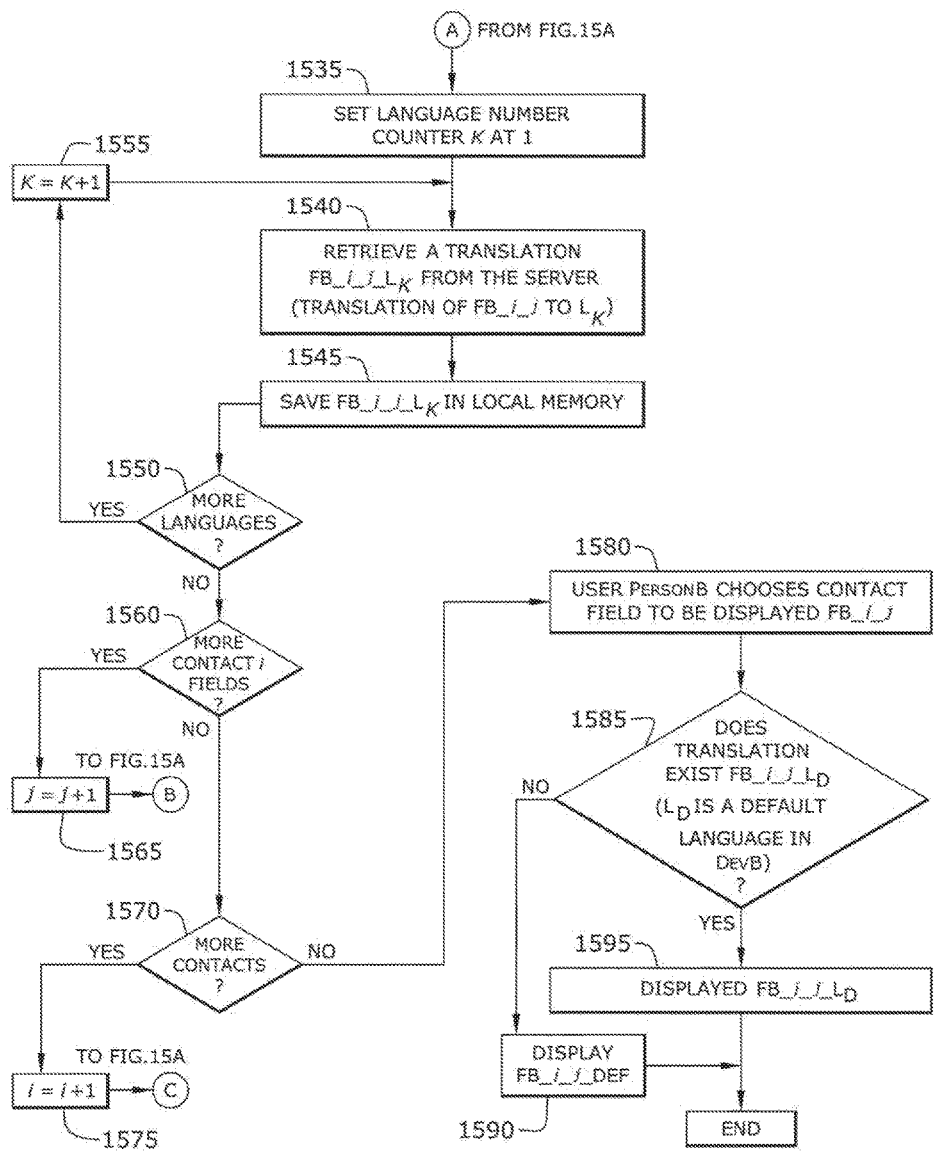

FIGS. 15A and 15B conceptually illustrates a process in some embodiments for displaying a selected field in the user-designated native language, if only this language of the translation exists on the remote server for the selected field.

Figure 16:
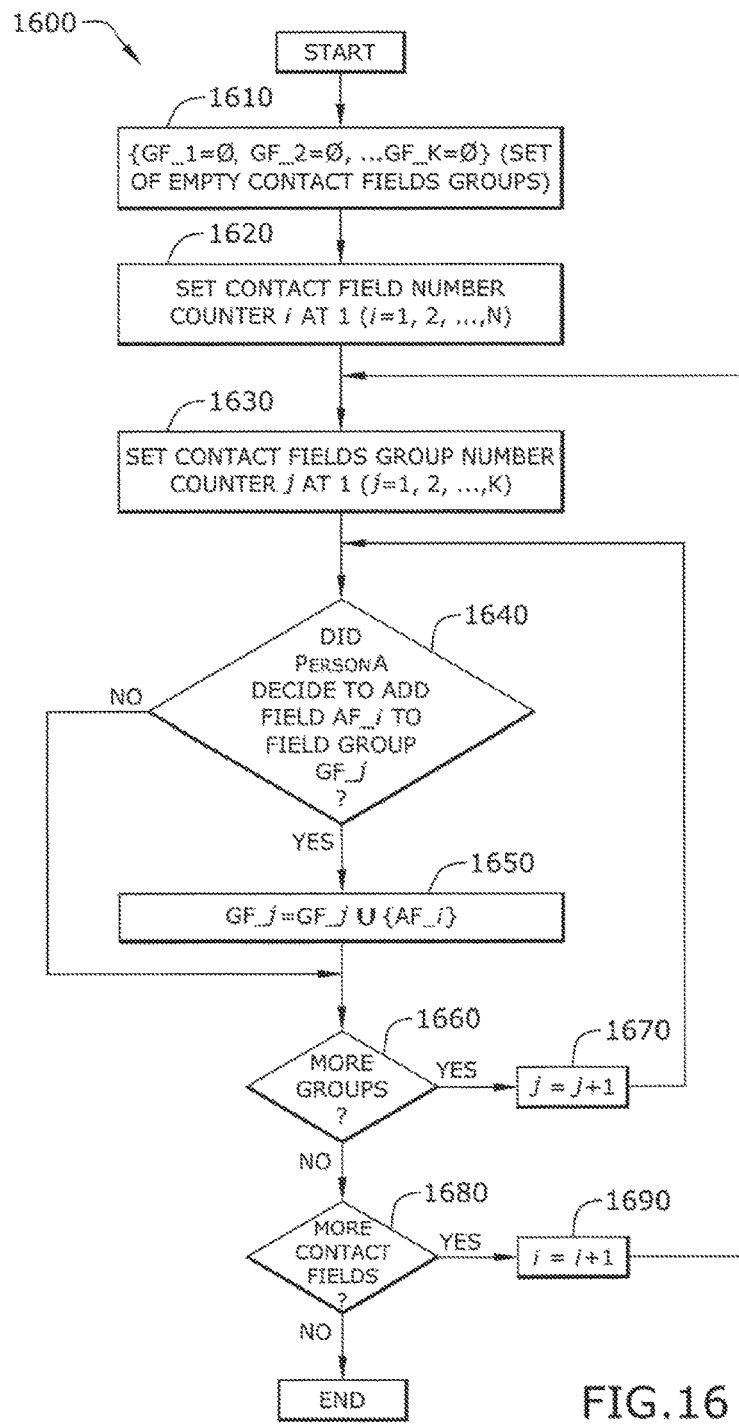

FIG. 16 conceptually illustrates a process for adding contact fields to contact field groups in some embodiments.

Figure 17:
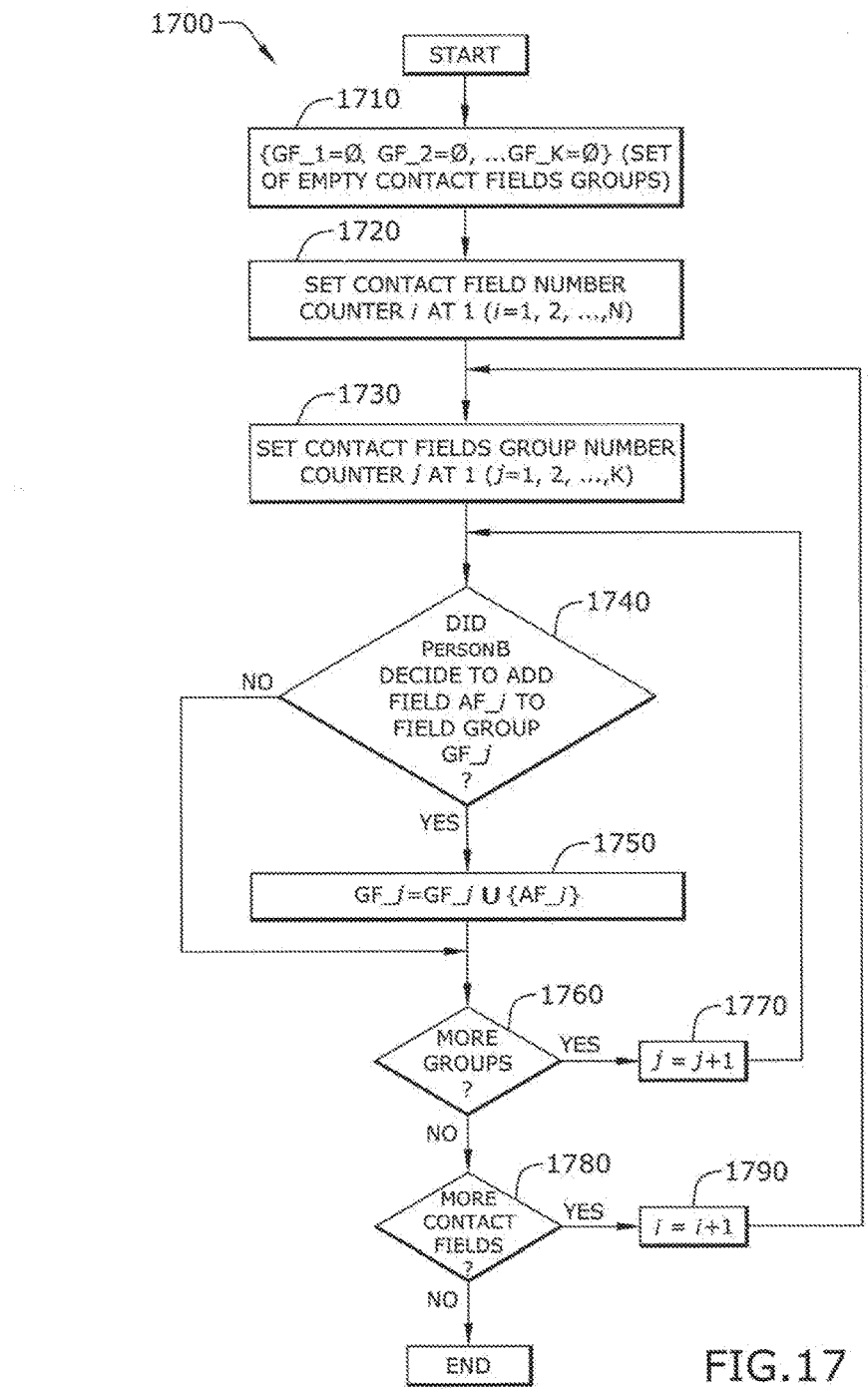

FIG. 17 conceptually illustrates a process for adding contact fields to respective groups of fields in some embodiments.

Figure 18:
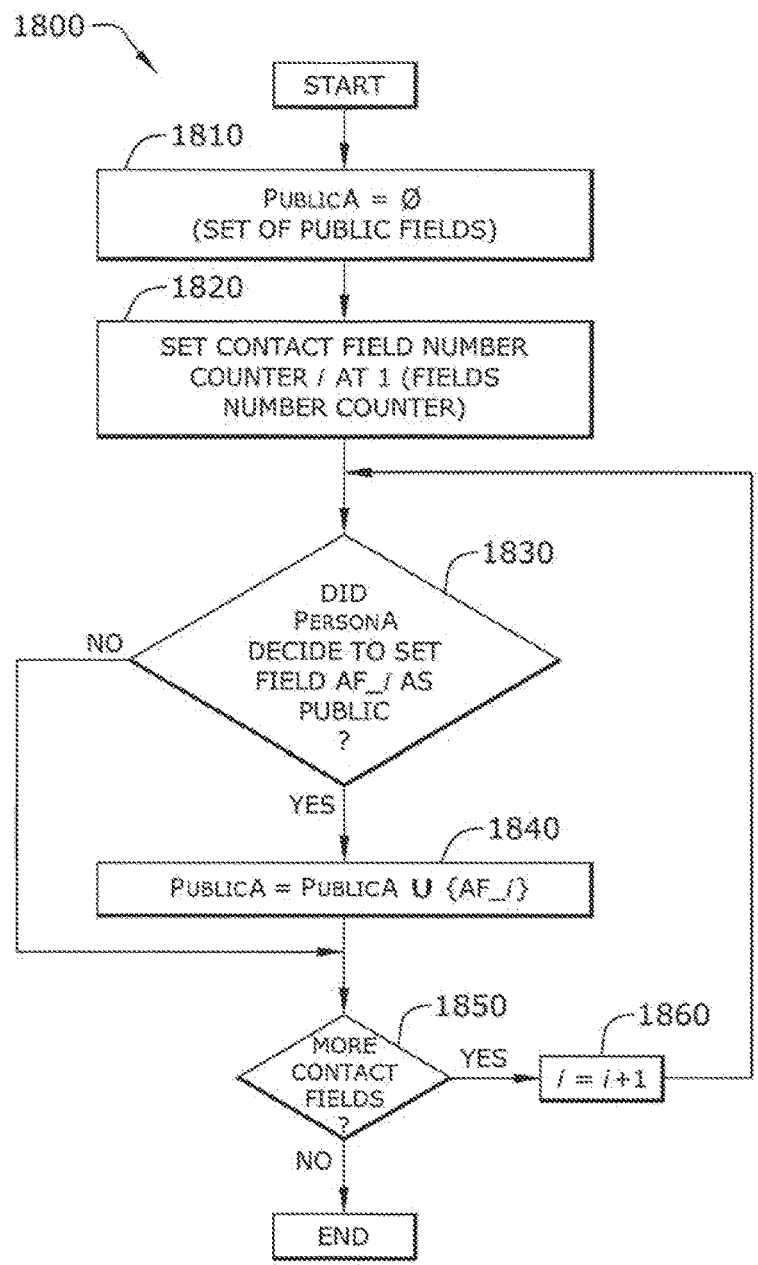

FIG. 18 conceptually illustrates a process for adding contact fields to a set of so-called public fields (visible to all users of the system) in some embodiments.

Figure 19:
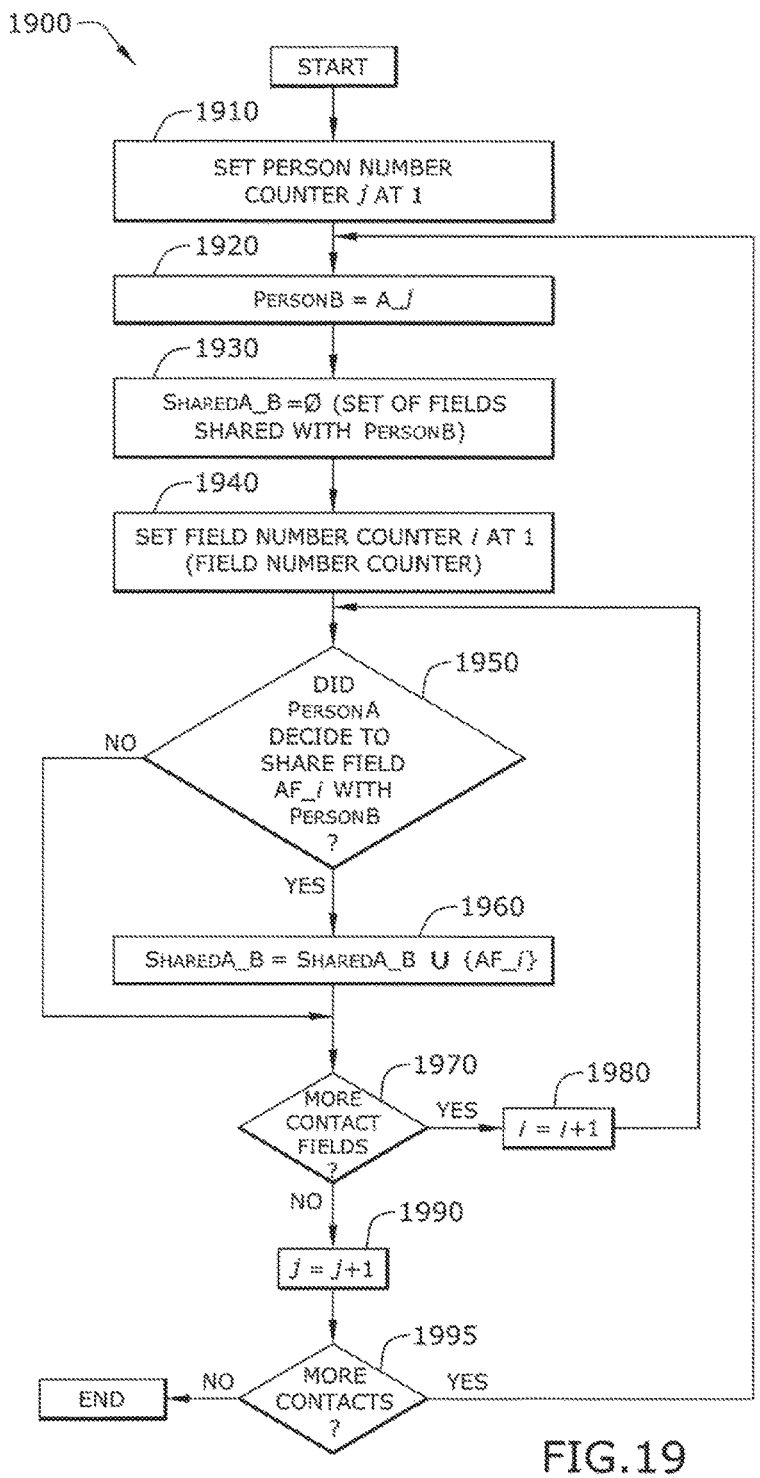

FIG. 19 conceptually illustrates a process in some embodiments for adding contact fields to a set of fields shared with a specific person, where the fields are visible to that person.

Figure 20:
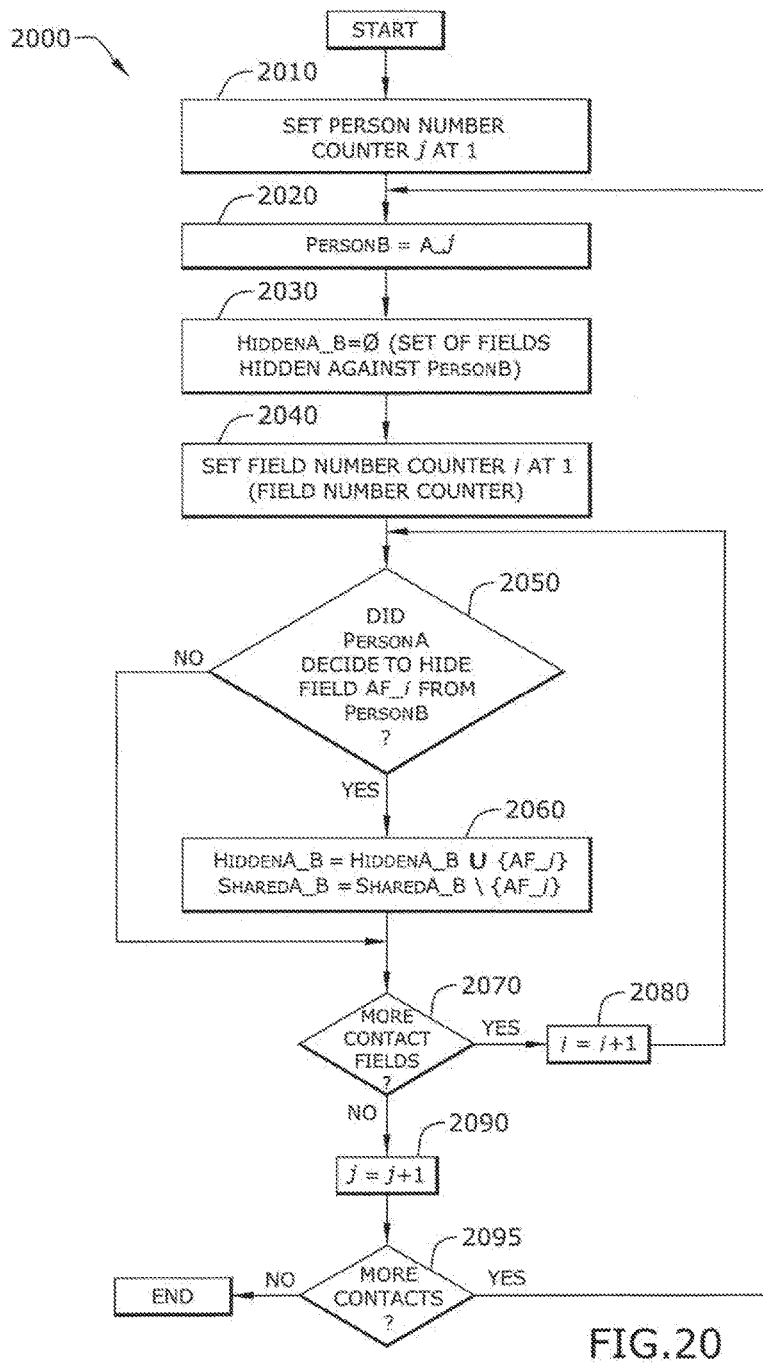

FIG. 20 conceptually illustrates a process in some embodiments for adding contact fields to a set of hidden fields against a specific person, such that the hidden fields are invisible to that person.

Figure 21:
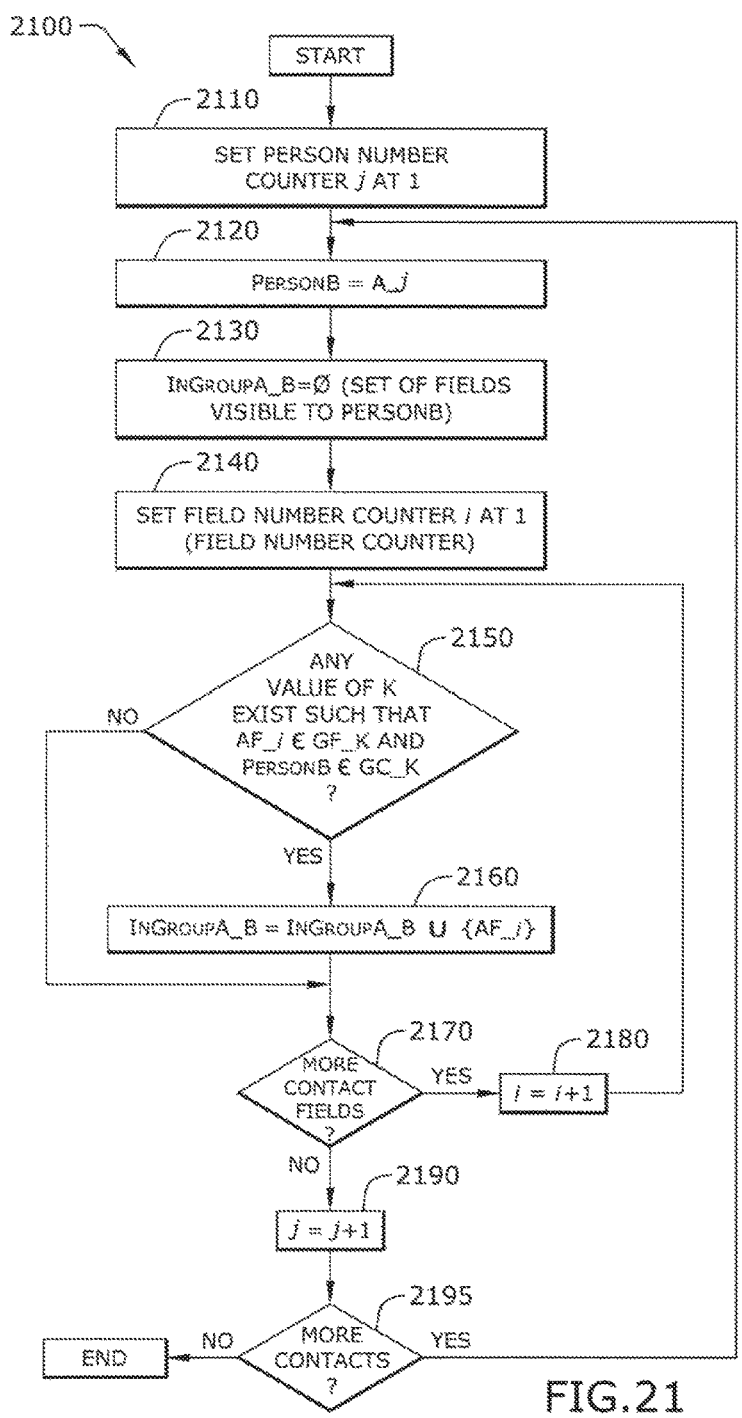

FIG. 21 conceptually illustrates a process in some embodiments for adding contact fields to a set of fields visible to a specific person (PersonB) because of the affiliation of that person (PersonB) to one of the contact groups of PersonA.

Figures 22, 23:
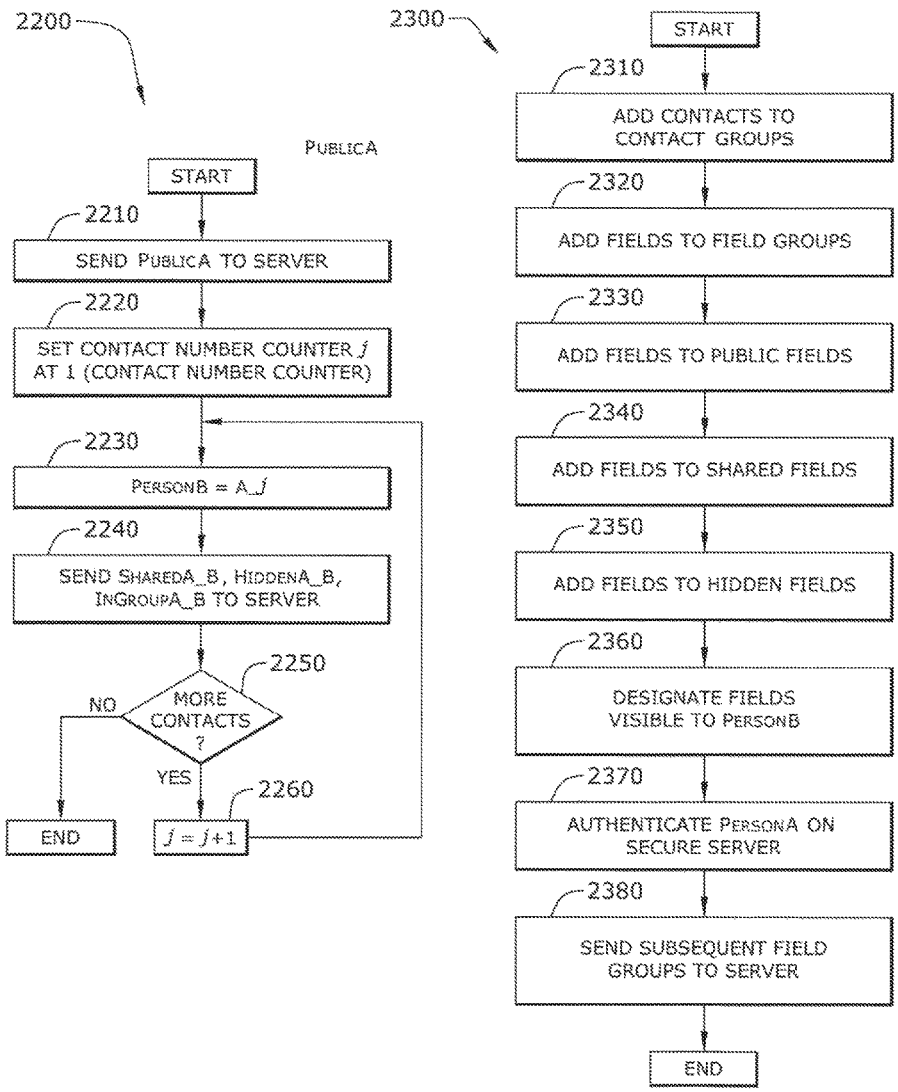

FIG. 22 conceptually illustrates a process in some embodiments for sending subsequent groups of a mobile device DevA owner's contact fields to the server.

FIG. 23 conceptually illustrates a process in some embodiments for managing so-called contact groups in a contact book in a device A (DevA) and managing the fields that describe the owner of that device.

Figure 24:
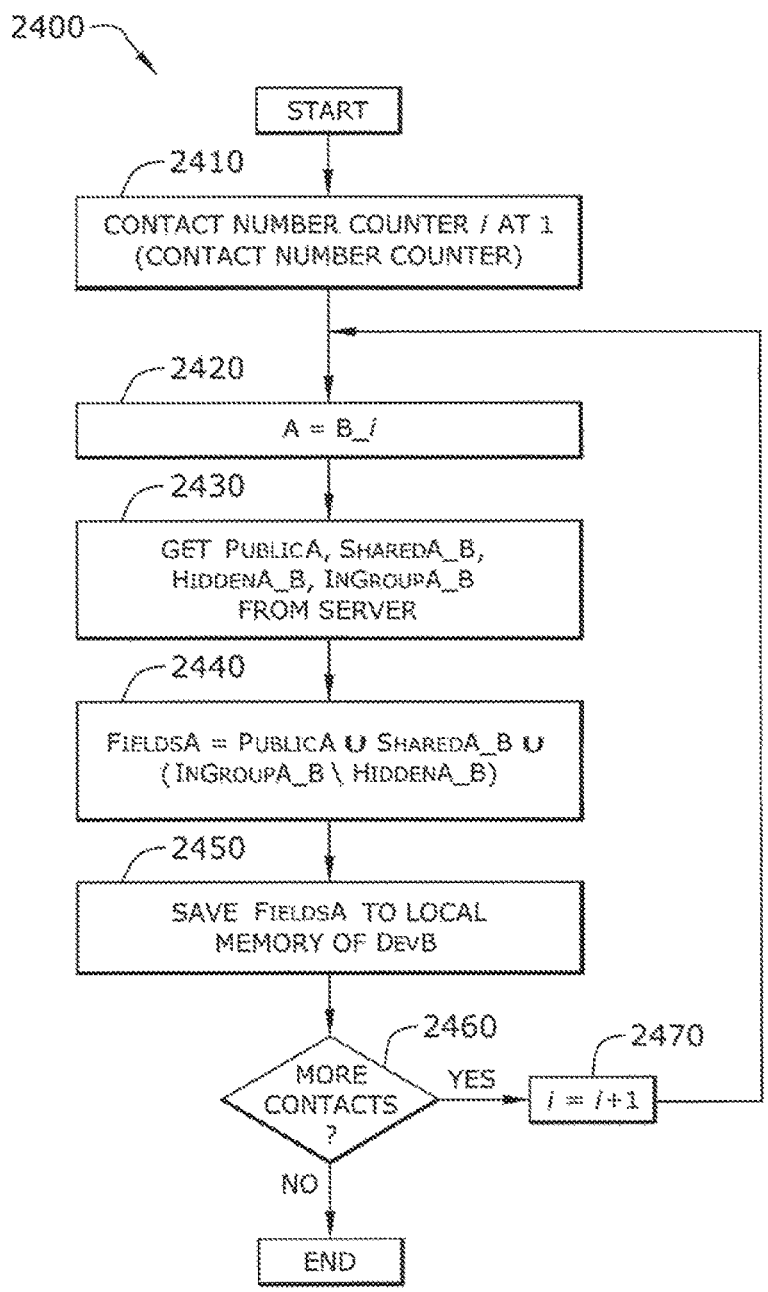

FIG. 24 conceptually illustrates a process in some embodiments for managing the groups of contacts from the perspective of the other device (here a device B, DevB) versus the device A (DevA) of FIG. 23 through downloading the content of each group of contact fields and storing them in device B (DevB) local memory.

Figure 25:
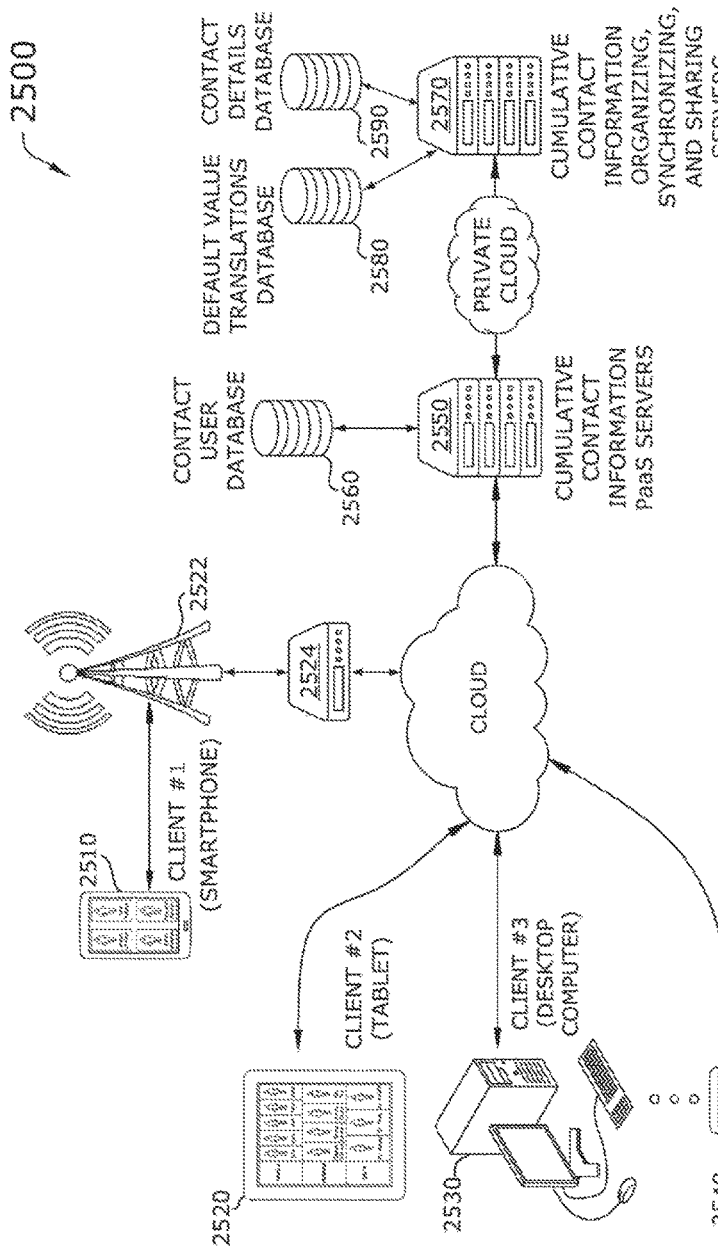

FIG. 25 conceptually illustrates a network architecture of a cumulative contact information organizing, synchronizing, and sharing system in some embodiments.

FIG. 26 conceptually illustrates an electronic system with which some embodiments of the invention are implemented.

DETAILED DESCRIPTION

In the following detailed description of the invention, numerous details, examples, and embodiments of a cumulative contact information organizing, synchronizing, and sharing system, a method for organizing, synchronizing, and sharing cumulative contact information, and a method for compiling contact information by joining contact identifiers are described. In describing embodiments of the cumulative contact information organizing, synchronizing, and sharing system, embodiments of the method for organizing, synchronizing, and sharing cumulative contact information, and embodiments of the method for compiling contact information by joining contact identifiers, reference is made to certain trademarks and/or wordmarks, including Bluetooth®, Wi-Fi®, Android™, Windows®. The Bluetooth® word mark and logos are registered trademarks owned by Bluetooth SIG Inc. Wi-Fi® is a registered trademark of Wi-Fi Alliance. Android™ is a trademark of Google Inc. Windows® is a registered trademark of MICROSOFT CORPORATION. While reference is made to the products and technology associated with these trademarks and word marks, it will be clear and apparent to one skilled in the art that the invention is neither limited by such products and technology nor to the embodiments set forth and that the invention can be adapted for any of several applications.

As stated above, contact information is useful in a variety of applications, such as voice, text, scheduling, etc., but managing contacts is a challenge because there are no existing systems that can organize, synchronize, and share cumulative contact information in a comprehensive and network-centric manner, such that each relevant contact holder is automatically provided the most recent/relevant contact information for each contact.

In addition, the number of mobile devices and other electronic devices available in the market, and the number of mobile devices and other electronic devices that individuals use, have increased dramatically over recent decades. In view of the proliferation of mobile devices used by people (or "users") at work, in personal scenarios, between family members, etc., the possibility of having redundant contact information or duplicated contacts is ever-present. This is a problem for most users who rely on manual updating of contact information. For instance, when a user ("User 1") interacts with another user ("User 2"), either User 1 or User 2 (or both) may relay updated contact information or provide contact details of another mutually related person. However, it is typically not the case that either User 1 or User 2 will have all of their mobile devices or electronic devices at their behest. As a result, any manual update that occurs will need to be replicated later on other devices. Yet this typically does not occur, for various reasons (forgetting, unable to find other devices, etc.). Thus, there are some devices that have a contact with a set of contact details, while other devices may (or may not) have the same contact, but have only a limited subset of the contact details.

Embodiments of the invention described in this specification solve such problems by a cumulative contact information organizing, synchronizing, and sharing system, a method for organizing, synchronizing, and sharing cumulative contact information, and a method for compiling contact information by joining contact identifiers (hereinafter referred to interchangeably as "contact identifiers", "identifiers", "IDs", or "contact IDs"). The cumulative contact information organizing, synchronizing, and sharing system and the method for organizing, synchronizing, and sharing cumulative contact information of the present disclosure continuously and automatically manage contact information and maintain updated contact information. Additionally, the method for compiling contact information by joining contact IDs of the present disclosure resolves problems with contact redundancy and duplication (e.g., identifies and removes duplicate contacts or redundant entries) and corrects improperly entered contact information.

In some embodiments, the cumulative contact information organizing, synchronizing, and sharing system is based on self-updating of contact information by each user. That is, each user only updates strictly his or her own contact information. In some embodiments, the self-updated contact information of all users is automatically synchronized across a plurality of contact information data sources, devices, and persistent data repositories within the cumulative contact information organizing, synchronizing, and sharing system. In this way, the cumulative contact information organizing, synchronizing, and sharing system makes all synchronized self-updated contact information available for other users (with whom the contact information was initially set to be shared).

In some embodiments, the method for organizing, synchronizing, and sharing cumulative contact information includes several steps that facilitate self-updating of contact information by each user. In some embodiments, the method for organizing, synchronizing, and sharing cumulative contact information constrains self-updating of contact information by a particular user to enable updates of the particular user's own contact information only. In some embodiments, the method for organizing, synchronizing, and sharing cumulative contact information includes several steps for automatically synchronizing the self-updated contact information of all users. In some embodiments, the method for organizing, synchronizing, and sharing cumulative contact information includes several steps which then make all synchronized self-updated contact information available for other users (with whom the contact information was initially set to be shared).

In some embodiments, the method for compiling contact information by joining contact identifiers includes several steps that purge duplicate contacts and redundant contact entries. In some embodiments, the method for compiling contact information by joining contact identifiers includes several steps that correct improperly entered contact information.

Embodiments of the disclosed cumulative contact information organizing, synchronizing, and sharing system (hereinafter referred to as "the cumulative contact information organizing, synchronizing, and sharing system," or simply "the system"), the method for organizing, synchronizing, and sharing cumulative contact information, and the method for compiling contact information by joining contact identifiers are described in this specification at a level of detail that would permit a person skilled in the relevant art to make and use the invention. In particular, embodiments of the cumulative contact information organizing, synchronizing, and sharing system, the method for organizing, synchronizing, and sharing cumulative contact information, and the method for compiling contact information by joining contact identifiers may be implemented for use on a variety of computing devices (both mobile devices and non-mobile computing devices), including mobile phones (e.g., smart phones), tablet computing devices (tablets), personal digital assistants (PDAs), and other computing devices that store contact information. The variety of computing devices and mobile devices is further differentiated on the basis of several different processing units (CPUs) that are available in modern hardware design, the architectures of each type of processing unit having several advantages for an intended computing device. Further differentiation of devices is based on differences in the kernel and the operating system (e.g., Android, iOS, Windows mobile, etc.) which manage the interface between a hardware layer and input/output control and operation at the user-interface layer.

While these differences often advantageously serve the end user of a computing device, there are also drawbacks in terms of the compatibility of data. In particular, when such computing devices support data for contact information, the contacts are typically stored in an "address book," a "book of contacts," or another such contact management application (hereinafter referred to as "address book"). Yet, many of the manufacturers of various operating systems and applications have developed platform-specific address books that are not compatible with the address book and contact data formats supported on other operating systems and/or applications. Therefore, users of different computing devices encounter difficulties related to the synchronization of contact data between different types of devices. Furthermore, such users are forced to manually recovery of such data in case of system crash or loss of computing device. Thus, implementations of the cumulative contact information organizing, synchronizing, and sharing system, the method for organizing, synchronizing, and sharing cumulative contact information, and the method for compiling contact information by joining contact identifiers account for these operating system and computing device differences. Thus, the cumulative contact information organizing, synchronizing, and sharing system, the method for organizing, synchronizing, and sharing cumulative contact information, and the method for compiling contact information by joining contact identifiers described in this specification can completely change the way people organize and share their personal, professional, cell phone, email, social network, etc. and any other contact information.

The problems noted above are solved by embodiments of the cumulative contact information organizing, synchronizing, and sharing system, embodiments of the method for organizing, synchronizing, and sharing cumulative contact information, and embodiments of the method for compiling contact information by joining contact identifiers. For instance, the system and the methods ensure that all self-updated and synchronized contact information is distributable across and compatible with the variety of computing devices. In some embodiments, this accomplished because the data recovery from a backup copy is stored on a central server, thereby allowing for seamless contact and address book recovery when a computing device system crashes or a mobile device goes lost. In some embodiments, synchronization of contact and address book data between different devices with different operating systems is automatically handled by a common platform for an exchange of such contact and address book data. Also, assigning data of individual persons (records) to special groups is supported by the system and the method (along with meta-data representations or so-called properties or attributes specific to each type of contact or address book data format), as is sharing of contact information between different users of the system (based on the existence of the users to specific contact groups), as well as translating selected contact data fields (records) into the language appropriate (native) to the user accessing (reading) the data.

By way of example, a person may have a contact book with several contacts and at least two contacts that relate to the same person. For one of the contacts, e.g., "Contact A_1", a personal identifier "ID_A" may uniquely identify contact "Contact A_1". For the other contact, "Contact B_1", a personal or business identifier "ID_B" may uniquely identify contact "Contact B_1". Although in different contexts, both contacts represent the same person and there may be a connection between both contacts. When joining the personal identifiers "ID_A" and "ID_B" is beneficial, people may wish to do so. Doing so may engage one or more fields of information about the identifier.

For instance, "ID_A" may have contact information fields "Field_A1", "Field_A2", . . . , "Field_An" which are associated with "ID_A1" "ID_A2" "ID_An" respectively. Likewise, "ID_B" may have contact information fields "Field_B1", "Field_B2", . . . , "Field_Bn" which are associated with "ID_B1", "ID_B2", . . . , "ID_Bn", respectively. Where there is a gap in the information between the respective fields, "ID_A" can be joined to "ID_B" to share specific information between the two.

When joining "ID_A" and "ID_B", the method for compiling contact information by joining contact identifiers includes steps for appending or replacing contact information fields of "ID_A" with fields shared from "ID_B". Next, the method for compiling contact information by joining contact identifiers includes steps for appending or replacing contact information fields of "ID_B" with fields shared from "ID_A". The method for compiling contact information by joining contact identifiers includes steps for appending ID connections from "ID_B" to connections of "ID_A".

In some embodiments, a user may cancel a joining operation between "ID_A" and "ID_B". In some embodiments, the method for compiling contact information by joining contact identifiers ensures that any contact information fields that were appended or replaced are cleared by the cancellation. Similarly, the ID connections from "ID_B" will be removed from "ID_A".

By way of example, when "ID_A" joins with "ID_B", the method for compiling contact information by joining contact identifiers starts by identifying any fields shared by either "ID_A" or "ID_B". For instance, fields "Field_A1", "Field_A3", and "Field_A6" may be shared by "ID_A" with "ID_B" while fields "Field_B2", "Field_B3", and "Field_B4" may be shared by "ID_B" with "ID_A". Expressions of the joining of the contact fields for "ID_A" and "ID_B" is described next.

ID_A (Field_A1, Field_A2, . . . , Field_A7=Field_B2, Field_A8=Field_B3, Field_A9=Field_B4, . . . , Field_An)

ID_B (Field_B1=Field_A1, Field_B2=Field_A3, . . . , Field_B8=Field_A6, . . . , Field_Bn)

Then IDA will be connected to "ID_A1", "ID_A2", . . . , "ID_An" and to "ID_B1" "ID_B2", . . . , and "ID_Bn".

By way of example, a particular application that implements the method for compiling contact information by joining contact identifiers may include "ID_A" as a personal ID of a user, and ID_B may represent a company that the user works for. Then, after joining "ID_A" and "ID_B", the personal contact information in "ID_A" can be appended with information about company name, the user's position, an office address, office phones, etc., from ID_B. The user's profile in company "ID_B" can be appended with information about the user's name, home address, home address, home phone, personal e-mail, etc., from "ID_A". Also, a list of linked contacts for "ID_A" will be appended with coworkers, managers, customers linked to "ID_B", etc.

While many of the embodiments, examples, and details provided above relate to personal contact information, in some embodiments, the cumulative contact information organizing, synchronizing, and sharing system and the method for organizing, synchronizing, and sharing cumulative contact information can be adapted for use in different fields such are authorization, HR management, people search, etc. Furthermore, in some embodiments, the cumulative contact information organizing, synchronizing, and sharing system and the method for organizing, synchronizing, and sharing cumulative contact information can create and/or support a variety of services that may be linked to the cumulative contact information organizing, synchronizing, and sharing system, such as sign in authorization, electronic wallets, etc.

Overall, the cumulative contact information organizing, synchronizing, and sharing system, the method for organizing, synchronizing, and sharing cumulative contact information, and the method for compiling contact information by joining contact identifiers work efficiently across all devices, operating systems, and contact/address book data formats because each user only updates strictly his own contact information and that information is automatically synchronized and updated with other users (with whom the contact information was initially set to be shared), the system and the methods disclosed herein revolutionize and dramatically simplify the way people share and update contact information. As such, any deployment of the cumulative contact information organizing, synchronizing, and sharing system or implementation of the method for organizing, synchronizing, and sharing cumulative contact information or the method for compiling contact information by joining contact identifiers have the capacity to completely change the way most people organize and share personal information, professional information, cell phone information, email or social network information, and/or any of several other such contact information details.

Although contact information may vary by user, and change over time, examples of typical contact information includes first name (or several first names, including nick names and informal shortened versions of first names, etc.), middle name, surname, address, business address, personal and business land-line telephone number, mobile phone number, other voice calling and/or text messaging numbers, fax numbers, e-mail addresses, world wide web addresses, social network profile identifications, graphic images (e.g., showing the image of the contact person, or showing other related persons, such as a key contact person), and other information related to such a person.

All contacts that are stored in an address book are typically entered manually with various fields of the contact information being periodically updated, changed, or added to. Such manual entry of contact information can be an extremely tedious and labor-intensive when the number of contacts stored in a user's address book grows larger and larger.

Embodiments of the cumulative contact information organizing, synchronizing, and sharing system, embodiments of the method for organizing, synchronizing, and sharing cumulative contact information, and embodiments of the method for compiling contact information by joining contact identifiers revolutionize dramatically simplify the way people share and update contact information. Each user only updates strictly his own contact information and that information is automatically synchronized and updated with other users (with whom the contact information was initially set to be shared). The core principle of the cumulative contact information organizing, synchronizing, and sharing system, the method for organizing, synchronizing, and sharing cumulative contact information, and the method for compiling contact information by joining contact identifiers is that each user has to update only his own contact information, rather than updating every single contact that a person might have.

In typical computing devices, a wired or wireless network interface is present which can facilitate synchronization of contact data between devices. For instance, a mobile device and a personal computer ("PC") or another mobile device may use a wireless interface, such as Bluetooth or Wi-Fi. Furthermore, synchronization of the contact data may be facilitated by locking/tying/connecting the user to one or more instant messengers or to social networking sites that allow the collection of personal data of friends and acquaintances of the user. Options for synchronizing the contact information listed above are limited, however, to the functionality of the equipment and/or their interfaces, as well as to the functionality of the existing instant messengers or social networking sites.

Embodiments of the cumulative contact information organizing, synchronizing, and sharing system, embodiments of the method for organizing, synchronizing, and sharing cumulative contact information, and embodiments of the method for compiling contact information by joining contact identifiers described in this specification differ from and improve upon currently existing contact management options. The differences and improvements relate to (i) translating selected fields of contact details into multiple languages beyond the preferred language of the person characterized by these fields and (ii) grouping contact fields that describe the owner of computing device DevA or computing device DevB and grouping individual items (contacts) of so-called address book as well as assigning these groups specific permissions for visibility (publicity) of individual groups of contact fields of the mobile device DevA or DevB owner. Several other differences exist between the existing state of the art and the system and the method of this disclosure. For instance, some embodiments of the system and the method differ from existing contact/address book management system because each user updates contact information for only the user's contact profile and then the updated information gets synchronized at the servers and is thereafter made available for distribution to other users as needed. Thus, the contact information for each user stays up to date and is automatically synchronized to cloud-network server(s) which make such updated contact details available to other users (to update the corresponding contact information of the user). Similarly, the user who updates his or her own contact profile may have several other contact profiles which they maintain locally on one or more computing devices. As those other people have contact information that may be changed, updated, modified, etc., the user is able to automatically obtain the latest detailed contact information without having to do anything.

In addition, embodiments of the cumulative contact information organizing, synchronizing, and sharing system, embodiments of the method for organizing, synchronizing, and sharing cumulative contact information, and embodiments of the method for compiling contact information by joining contact identifiers improve upon the currently existing options in ways that go beyond the personal contact information described above. In particular, the cumulative contact information organizing, synchronizing, and sharing system, the method for organizing, synchronizing, and sharing cumulative contact information, and the method for compiling contact information by joining contact identifiers is based on a conceptual framework that has each user update only his or her personal contact information (not contact information of other users), and also includes functionality within the same framework for corporate-related information that would be administered from the corporate side when the user, for example, has many contacts who are likely to have originated via a single "professional" or "work" context and be associated with the user by way of corporation. In some cases, a contact from a work or professional context may also have another relationship that sets another context into play. For example, a colleague at work may also be a friend outside of work, regardless of where they met (e.g., at work, at home, etc.). In that case, those contacts are likely to have originated in multiple different contexts. For example, some of the contacts may be pure personal contacts with no other contextual relationship (e.g., a family member, a friend or neighbor, etc.), and other contacts may be work-related contacts (e.g., colleagues from work, personnel at other organizations who may provide a contact point at the other organization in relation to a particular product or service), and then a set of mixed contacts who qualify as personal contact and work contacts. There are several other types of "personal", "professional", "work related", and/or "colleague" type contacts which can be further sub-divided and combined according to different relationships. Thus, for any given set of contacts that a person saves, it is very troublesome to update each of the contact profiles with the correct (updated) information (which may include several types of updates for phone, email, address, occupation, etc.).

As noted above, it is typical for most people to have many contacts—perhaps hundreds or more different contacts from a variety of contexts. Since many people update contact information routinely when life events occur—such as moving, promotions, new job, new phone number for a new phone, new email address for work, new email for personal, and so on—one can see how daunting the task of monitoring and managing contacts becomes. It is practically impossible to keep up with all of the continuously changing information, and therefore, simply not realistic to suggest that a person can manually update all contact on a regular basis to keep the contact profiles up to date.

Nevertheless, embodiments of the cumulative contact information organizing, synchronizing, and sharing system, embodiments of the method for organizing, synchronizing, and sharing cumulative contact information, and embodiments of the method for compiling contact information by joining contact identifiers revolutionize and dramatically simplify the way people share and update contact information. The core principle is that each user updates only his or her personal contact information, while corporate-related information will be administered from the corporate side. Each user only updates strictly his or her own contact information and that information is automatically synchronized and updated with other users (as configured by the user—to be shared). Also, there are a lot of services that can be linked to the system, such as sign in authorization, electronic wallets, etc.

In this specification, there are several descriptions of methods and processes that are implemented as software applications, mobile applications (or mobile "apps"), computer programs, or embedded programs which run on electronic devices, mobile devices, computers, etc., (or simply, "computing devices") to perform the steps of the methods and/or processes. However, it should be noted that for the purposes of the embodiments described in this specification, the word "method" is used interchangeably with the word "process". Processes or methods for organizing, synchronizing, and sharing cumulative contact information, and/or processes or methods for compiling contact information by joining contact identifiers are described, therefore, by reference to example processes that conceptually illustrate steps of processes for organizing, synchronizing, and sharing cumulative contact information, and/or processes for compiling contact information by joining contact identifiers.

Several more detailed embodiments are described in the sections below. Section I describes contacts, contact fields, and contact fields grouping. Section II describes default and translated contact details. Section III describes contact fields grouping. Section IV describes some processes for providing and retrieving contact details and for adding contact fields groups. Section V describes an electronic system that implements some embodiments of the cumulative contact information organizing, synchronizing, and sharing system.

I. Contacts, Contact Fields, and Contact Fields Grouping

By way of example, FIG. 1 conceptually illustrates an example of local contacts 100 including PersonA local contacts on a first device A (DevA 110) and PersonB local contacts on a second device B (DevB 120), where the data format of the contacts are strings whose elements are numbered from 1 to N. As shown in this figure, DevA 110 includes a set of local contact items 118 belonging to PersonA, which are identified as a set of contact elements "A_1" 112, "A_2" 114, . . . , "A_M" 116. The other device shown in this figure, DevB 120, includes a different set of local contact items 128 belonging to PersonB, which are identified as a set of contact elements "B_1" 122, "B_2" 124, . . . , "B_P" 126.

Turning to another example, FIG. 2 conceptually illustrates a ten element set of local PersonA contacts 200 on the device A (DevA 110). As shown in this figure, the ten element set of local PersonA contacts 200 is an expansion of contact elements from the set of local contact items 118 described by reference to FIG. 1. Specifically, the ten element set of local PersonA contacts 200 of DevA 110 includes identified contact elements "A_1" 112, "A_2" 114, "A_3" 220, "A_4" 222, "A_5" 224, "A_6" 226, "A_7" 228, "A_8" 230, "A_9" 232, and "A_10" 234. The contact element "A_M" 116 described by reference to FIG. 1 may be considered, for the sake of this example, as being "A_10" 234, but in some other examples may refer instead to some other contact element.

Although the examples in FIGS. 1 and 2 focus on individual contact entries and the fields supporting content values (e.g., text values) for each of the fields, such organization is not limited to only individual contacts. For instance, contact group assignments may further organize individual contacts that a person has included on a given device. By way of example, FIG. 3 conceptually illustrates an example of contact group assignments 300. Specifically, the ten element set of local PersonA contacts 200, described by reference to FIG. 2, and some additional local PersonA contacts are organized according to a plurality of group assignments, including "GC_1" 315 for a "family" group of contacts, "GC_2" 325 for a "physicians" group of contacts, "GC_3" 335 for an "associates" group of contacts, and "GC_K" 345 for some other group of contacts.

In this example, the owner of the contacts (e.g., PersonA) has provided the groups with descriptive names that characterize the features of the groups. Thus, the family group "GC_1" 315 includes presumptive family contact elements "A_2" 114, "A_4" 222, "A_5" 224, "A_9" 232, and "A_10" 234; the physicians group "GC_2" 325 includes presumptive physician contact elements "A_1" 112, "A_2" 114, "A_4" 222, and "A_8" 230; and the associates group "GC_3" 335 includes presumptive associate contact elements "A_3" 116, "A_6" 226, and "A_7" 228. The group "GC_K" 345 is labeled without a descriptive name to emphasize that the owner (e.g., PersonA) can have groups defined according to any relationship that the contacts may have with the owner, each other, or otherwise. As shown in the "GC_K" 345 group of contacts, the owner has provided contact element "A_X" 350, contact element "A_Y" 355, and contact element "A_Z" 360, each of which would be included on the owner's device, DevA 110 as described above by reference to FIG. 1.

While a limited number of groups are shown in FIG. 3, a person skilled in the relevant art would appreciate that the there is no limit to the number of groups of contacts that are possible. In this figure, the groups are numbered or organized by alphanumerical labels "GC_1", "GC_2", "GC_3", . . . , "GC_K", where "GC_1", "GC_2", and "GC_3" conform to the natural sequence of counting numbers, but are not intended to suggest any specific group contact level, preference, order, class, or rank, or to otherwise value one group of contacts over another group of contacts. Instead, all groups of contacts may be considered, at a fundamental level, as having an undefined position, and therefore, simply being existing as a group of contacts. Furthermore, as this example of contact group assignments 300 shows, the same contacts (elements of the set of contacts) can belong to different groups. For example, contact elements "A_2" 114 and "A_4" 222 are associated with both the family group "GC_1" 315 and the physician group "GC_2" 325.

Similarly, FIG. 4 conceptually illustrates a set of contact group assignments 400 with the contacts in each contact group visually appearing as icons. This example demonstrates how visual output of group assignments (e.g., visually outputting the groups to a screen of a computing device) can be adjusted to show icons for the contacts, instead of showing each contact in a group as an individual contact element. Thus, as shown in this figure, the family group "GC_1" 410 includes five icons to represent the five contact elements, "A_2" 114, "A_4" 222, "A_5" 224, "A_9" 232, and "A_10" 234, of the family group "GC_1" 315 described by reference to FIG. 2; the physicians group "GC_2" 420 includes four icons to represent the four contact elements, "A_1" 112, "A_2" 114, "A_4" 222, and "A_8" 230, of the physicians group "GC_2" 325 described by reference to FIG. 2; and the associates group "GC_3" 430 includes three icons to represent the three contact elements, "A_3" 116, "A_6" 226, and "A_7" 228, of the associates group "GC_3" 335 described by reference to FIG. 2. Also, the other group "GC_K" 440 includes seven icons, indicating that additional contacts have been added to the group in relation to the group "GC_K" 345 described by reference to FIG. 2.

Turning to FIG. 5, a set of PersonA contact fields are conceptually illustrated as a series of contact field elements 500. As shown in this figure, the series of contact fields 500 includes contact field elements numbered from 1 to N, each with a fillable contact field. Specifically, contact field element "AF_1" 510 includes fillable contact field 512, contact field element "AF_2" 520 includes fillable contact field 522, contact field element "AF_3" 530 includes fillable contact field 532. Additional contact field elements may be present, concluding with contact field element "AF_N" 540 which includes fillable contact field 542. In this example, the contact field in each contact field element of the series of contact field elements 500 is freely filled in by a person (i.e., PersonA). The fillable contact fields (any number of them) are meant to describe detailed information about that person (i.e., PersonA) and therefore they do not necessarily belong to PersonA's contact book, whose purpose is primarily to collect data of other people (e.g., PersonA's friends, family, acquaintances, etc.).

A wide range of contact information is supported by embodiments of the system and the method. By way of example, FIG. 6 conceptually illustrates a series of contact field elements 600 with several types of contact fields defined. As shown in this figure, contact field element "AF_1" 610 is defined as a "first name" contact field type 614, contact field element "AF_2" 620 is defined as a "surname" contact field type 624, contact field element "AF_3" 630 is defined as an "address" contact field type 634, contact field element "AF_4" 640 is defined as an "e-mail" contact field type 644, with optionally more contact field elements, until contact field element "AF_N" 650, which is any defined contact field type 654 (labeled "other_field" in this example). Thus, a person filling in the contact fields of the series of contact field elements 600 would fill in the contact fields in conformity with the contact field types defined for the contact field elements. In this example, PersonA would fill in the first name for fillable contact field 612, a surname (or last name) for fillable contact field 622, an address (e.g., domicile address, business address, etc.) for fillable contact field 632, an e-mail address for fillable contact field 642, and so on.

To illustrate how the cumulative contact information organizing, synchronizing, and sharing system and the method for organizing, synchronizing, and sharing cumulative contact information of the present disclosure provides a technical solution for contact fields visibility permissions, let contact items list A_i of PersonA consist of ten elements A_1, A_2, . . . , A_10 (as described above by reference to FIG. 2). Contact fields of PersonA stored in a local memory of the device DevA are identified as a set of contact field elements AF_1, AF_2, . . . , AF_N (as described above by reference to FIG. 5), while each of these contact field elements has its own specific contact field type indicating the type of content that is expected to be recorded in the contact field element (as described above by reference to FIG. 6).

To effectively manage visibility permissions of the individual contact fields, the user can group the contact fields into subsets of contact fields (contact field groups) GF_1, GF_2, . . . , GF_K. Moreover, in order to easily identify the purpose or intention of each contact field group, names may be given to the contact field groups which are evocative of the purpose or intention for which the contact field group was created. For example, a name such as 'quick contact' can be given to a specific contact field group. In order to manage groups of contact fields, a set of groups of contact fields GF is included, and the set of groups of contact fields GF includes elements that are the subsequent sets of fields.

By way of example, FIG. 7 conceptually illustrates a set of contact field group assignments 700 of contact fields to functional contact field groups, GF_1, GF_2, . . . , GF_K. Each contact field group assignment in the set of contact field group assignments 700 provides an organization to the functional contact field group via different subsets of PersonA's contact fields. For example, a "basic information" contact field grouping GF_1 includes a "first_name" contact field element and a "surname" contact field element. Similarly, a "complete information" contact field grouping GF_2 includes the "first_name" contact field element, the "surname" contact field element, an "address" contact field element, and an "e-mail" contact field element. Likewise, a "quick contact" contact field grouping GF_3 includes the "first_name" contact field element and the "e-mail" contact field element.

Additional, higher-level organization of the contact field groups can be captured by "super grouping" multiple contact field groupings. By way of example, FIG. 8 conceptually illustrates a super group assignment 800 of several functional contact field groupings. Specifically, the super group GF is assigned the "basic information" contact field grouping GF_1, the "complete information" contact field grouping GF_2, and the "quick contact" contact field grouping GF_3 from the set of contact field group assignments 700 described by reference to FIG. 7.

To use the cumulative contact information organizing, synchronizing, and sharing system and the method for organizing, synchronizing, and sharing cumulative contact information of the present disclosure, the idea behind this invention is to dramatically simplify the experience of managing one's contacts which can run up to tens, hundreds and even thousands for some of us. Therefore the application will be extremely to the point and very simple to use. The core principle of this invention is that each user has to update only his own contact information, rather than updating information for every single contact that he has (most of us have hundreds of contacts these days). This simple yet novel idea will revolutionize the way we update/share contacts that will not require manual input of constantly changing information of our existing contacts.

By way of example, FIG. 9 conceptually illustrates a set of contact fields 900 that PersonA has set on device A (DevA). As shown in this figure, the set of contact fields 900, as labeled, include AF_1 910, AF_2 920, AF_3 930, and AF_N 940, as well as empty fields 915, 925, 935, and 945. Also, there may be additional contact fields as denoted by the " . . . " separating AF_3 930 and AF_N 940. None of the contact fields include any text or content, but each contact field encapsulates an empty field in which PersonA can enter information into. When information is entered into any of the empty fields 915, 925, 935, and 945, the information is then associated automatically with the respective encapsulating contact field (i.e., AF_1 910, AF_2 920, AF_3 930, and AF_N 940). Specifically, contact field AF_1 910 is associated with empty field 915, contact field AF_2 920 is associated with empty field 925, contact field AF_3 930 is associated with empty field 935, and contact field AF_N 940 is associated with empty field 945. Thus, detailed information about PersonA are stored in the DevA local memory in such contact fields (e.g., AF_1 910, AF_2 920, AF_3 930, . . . , AF_N 940). As long as the owner of the device DevA does not enter any data into the empty fields (e.g., empty field 915, empty field 925, empty field 935, . . . , empty field 945), they remain empty so they do not include any information.

To share contact information with other users of computing devices or mobile devices, PersonA enters so-called default values (i.e., values in the native language or mother tongue of that person) into the empty fields of his preference from the set of contact fields 900 (e.g., AF_1 910, AF_2 920, AF_3 930, and AF_N 940). In the next section, default values and translations of default values are described.

II. Default and Translated Contact Details

By way of example, FIG. 10 conceptually illustrates an example of default values associated with a set of contact fields 1000. As shown in this figure, the set of contact fields 1000 are labeled by IDs: AF_1 1010, AF_2 1020, AF_3 1030, and AF_N 1040. Each contact field encapsulates an empty field, which is associated with a default value. Specifically, AF_1 1010 encapsulates empty field 1012, which is associated with default value AF_1_DEF 1014, AF_2 1020 encapsulates empty field 1022, which is associated with default value AF_1_DEF 1024, AF_3 1030 encapsulates empty field 1032, which is associated with default value AF_1_DEF 1034, and AF_N 1040 encapsulates empty field 1042, which is associated with default value AF_1_DEF 1044. For an unambiguous organization of PersonA's contact details, particular fields have their specific type, which characterizes a feature of the person that is expected to be entered into the field, such as 'first_name', 'surname', 'city', and so on. Importantly, PersonA decides which fields will be filled in by him, and which ones will remain empty. PersonA is not limited or forced as to the number of fields to be filled in and does not need to fill them in or follow any particular order. Hence, values for any of the fields can be omitted, thus the series of the fields does not need to be a continuous one.

Now turning to another example, FIG. 11 conceptually illustrates an example of a set of contact fields 1100 with empty fields being set to exemplary default values associated contact field types. As shown in this figure, the set of contact fields 1100 includes AF_1 1110, AF_2 1120, AF_3 1130, and AF_N 1140. Each contact field encapsulates an empty field, which is associated with a default value of a particular field type. Specifically, AF_1 1110 encapsulates empty field 1112, which is associated with default value "JAN" 1116 of field type "FIRST-NAME" 1114, AF_2 1120 encapsulates empty field 1122, which is associated with default value "WINNICKI" 1126 of field type "SURNAME" 1124, AF_3 1130 encapsulates empty field 1132, which is associated with default value "WARSZAWA" 1136 of field type "CITY" 1134, and AF_N 1140 encapsulates empty field 1142, which is associated with default value "JAN@DOMAIN.PL" 1146 of field type "E-MAIL" 1144.

While the contact field values typically are default values (unless the device operator overrides the default values), in some cases, language limitations arise in usage of contact/address book applications. For instance, when a person accepts the default values on device, it is highly likely that the default values will already be written in the mother tongue of that person (unless there is some reason to have a different language set as the default language). This is problematic when contact information is shared between different devices (with different owners/users), since those devices may be located in several different places where different languages are commonly used. The language limitations typically increase the difficulty of easily synchronizing contacts between different address books of different users. However, the system and the method of the present disclosure includes language translation that ensures the contact (e.g., text data) provided for any given field is properly set according to a language preference of user.

By providing language translation, the system makes it easier to read and sometimes also to understand the content of some of the default value fields associated with PersonA (who used DevA to provide the contact values) by a person using device B (DevB) in some other location, where the language commonly used is different from the mother tongue of PersonA. Such language translation capability is possible in a way that allows a contact value-setting device (e.g., DevA) to be set with defined translations of one or more chosen fields' default values in one or more other languages.

By way of example, FIG. 12 conceptually illustrates a two-dimensional matrix 1200, which is created by the assignment to a person's subsequent contact fields (AF_1 to AF_N) of default values and other values, being translations of these default fields into other languages ($L_1, L_2, \ldots, L_N$). As shown in this figure, the two-dimensional matrix includes a set of field IDs for a set of contact fields comprising AF_1 1210, AF_2 1220, AF_3 1230, and AF_N 1240. Each contact field is associated with a default value, AF_1_DEF 1212, AF_2_DEF 1222, AF_3_DEF 1232, and AF_N_DEF 1242. Each default value is associated with several values in other languages. Specifically, default value AF_1_DEF 1212 is at least associated with a value in language $L_1$ AF_1_$L_1$ 1214, a value in language $L_2$ AF_1_$L_2$ 1216, and a value in language $L_N$ AF_1_$L_N$ 1218. Similarly, default value AF_2_DEF 1222 is at least associated with a value in language $L_1$ AF_2_$L_1$ 1224, a value in language $L_2$ AF_2_$L_2$ 1226, and a value in language $L_N$ AF_2_$L_N$ 1228. Likewise, default value AF_3_DEF 1232 is at least associated with a value in language $L_1$ AF_3_$L_1$ 1234, a value in language $L_2$ AF_3_$L_2$ 1236, and a value in language $L_N$ AF_3_$L_N$ 1238. Finally, the two-dimensional matrix 1200 shown in this figure includes default value AF_N_DEF 1242, which is at least associated with a value in language $L_1$ AF_N_$L_1$ 1244, a value in language $L_2$ AF_N_$L_2$ 1246, and a value in language $L_N$ AF_N_$L_N$ 1248.

In another example, FIG. 13 conceptually illustrates an example of a two-dimensional matrix 1300 which includes default values for the contact fields and their respective translation values in several other exemplary languages. For instance, if the mother tongue of PersonA is Polish, and DevA includes default values in the mother tongue, as well as translations of the default values in English, German, and Italian, then other users would be able to easily understand the values of PersonA with little trouble, assuming PersonB speaks in mother tongue English and uses device B (DevB), PersonC speaks in mother tongue German and uses device C (DevC), and PersonD speaks in mother tongue Italian and uses device D (DevD).

As shown in this figure, the two-dimensional matrix 1300 includes a set of field IDs for a set of contact fields comprising AF_1 1310, AF_2 1320, AF_3 1330, and AF_N 1340. Each contact field is associated with a field type and a default value of the corresponding field type, namely, field type FIRST_NAME 1311 and default value of "JAN" 1312 for AF_1 1310, field type SURNAME 1321 and default value of "WINNICKI" 1322 for AF_2 1320, field type CITY 1331 and default value of "WARSZAWA" 1332 for AF_3 1330, and field type E-MAIL 1341 and default value of "JAN@DOMAIN.PL" 1342 for AF_N 1340. Each default value is associated with several values in other languages. Specifically, default value "JAN" 1312 is at least associated with a first name field type value of "JOHN" 1314 in language $L_1$ (English), a first name field type value of "JOHANN" 1316 in language $L_2$ (German), and a first name field type value of "GIANNI" 1318 in language $L_N$ (Italian). The default value "WINNICKI" 1322 is associated with the same last name (surname) field type value of "WINNICKI" in language $L_1$ (English) 1324, $L_2$ (German) 1326, and $L_N$ (Italian) 1328. However, default value "WARSZAWA" 1332 is at least associated with a city field type value of "WARSAW" 1334 in language $L_1$ (English), a city field type value of "WARSCHAU" 1336 in language $L_2$ (German), and a city field type value of "VARSAVIA" 1338 in language $L_N$ (Italian). Similar to the surname field type value, the default value "JAN@DOMAIN.PL" 1342 is associated with the same e-mail field type value "JAN@DOMAIN.PL" in language $L_1$ (English) 1344, $L_2$ (German) 1346, and $L_N$ (Italian) 1348.

The default field values of the PersonA contact information and the corresponding translations into several different tongues in this example demonstrates the ability that a person has in overcoming language-based barriers or hurdles when the person provides one or more translations/transliterations or even different names for default values for different languages or regions. This becomes important in drastically different languages such as Arabic, Chinese, Russian and etc. For example most of Eastern Asian people introduce themselves to westerners by using western names/nicknames and not their native names. For instance Korean person by the name of Kim Boo Son calls himself as Stanley Kim when he introduces himself to foreigners. The advantage of having such a translation feature is even greater when contact information is available over a shared contact data service, such as a cloud-based network system. In such a scenario, for example, the default value of "JAN" 1312 for the FIRST_NAME field 1311 gets an understood translation from the Polish name "Jan" into a corresponding English transliteration "Yann". Furthermore, since the owner of the fields (e.g., PersonA) defines the content of the translations and selects the translation languages, the owner is empowered to provide the localized name he or she wished to be called in the translation language. This is especially useful when a name has multiple translations from a native language to a single translation language (e.g., the Polish name Jan in the English language may be pronounced as "Yaan" or "Yann"). This also applies to other contact-related fields such as addresses, etc. In addition, in some cases, the name of the contact might be written in native alphabet, which is not readable to contacts who are not literate in that language. In those cases, they will be able to provide spelling in other alphabets of their preference. In some embodiments, the owner will be able to use the International Phonetic Alphabet (IPA) system to enter the pronunciation of his/her name or last name.

Audio, audio files, and/or audio-based systems can be involved in overcoming language-based barriers or hurdles when the person provides one or more translations for default values. For example, the user can provide an audio file with the appropriate pronunciation of their name. The advantage of having such a translation feature is even greater when contact information is available over a shared contact data service, such as a cloud-based network system.

It is noteworthy that not all of the contact field default values require translation into other languages, and the translation of some of them does not have to make any sense. For example, the translation of the SURNAME 1321 field with default value of "WINNICKI" 1322, as shown in FIG. 13, or of the E-MAIL 1341 field with default value of "JAN@DOMAIN.PL" 1342 involves no change across all of the other translatable languages. On the other hand, the translation of some fields, such as the name of a city, can allow or greatly facilitate its identification by a person from another country (e.g., translation of Polish capital city Warszawa).

A list of contacts in so-called contact book of PersonB mobile device (DevB) provides details of various people (including, e.g., PersonA). Such a contact book can be represented as a matrix whose rows make different contacts and the columns correspond to the subsequent fields of these contacts (subsequent types of fields).

Due to the possibility of having multiple translations from a single default contact value to multiple translated values in a target language (e.g., "Jan" translated to "Gianni", "Giovanni", "Giovannino", etc.), a contact book may be conceptually understood as a three-dimensional matrix (instead of a two-dimensional matrix as the examples above demonstrate), where the third dimension (matrix depth) is determined by the number of translations of these fields into other languages than the default for contact items in the contact book. Furthermore, no specific matrix-like contact book shape is required to organize the data, and especially since the number of contact fields for subsequent contacts does not need to be constant, and as explained above, not for all of the fields there will have translations into other languages and each of the contacts can define the scope of the translated fields as well as the number of languages in its sole discretion.

Additional language content translation details are described by reference to FIG. 14, which conceptually illustrates a process 1400 for entering contact field content translations in languages other than the default language of the user. The process 1400 may be implemented by a computer program, such as a client-side software application that runs on a processor of a client computing device. An example of such a client-side computing device is a device DevA, used by a person PersonA (e.g., a mobile smartphone device, a tablet computing device, etc.). Specifically, the example shown in FIG. 14 includes translating contact fields from the perspective of PersonA with PersonA's data being loaded into the memory of the device DevA.

In some embodiments, the process 1400 starts (at 1410) when PersonA enters default values in his mother tongue (e.g., AF_1_DEF, AF_2_DEF, AF_N_DEF) to the selected fields from the set of AF_1, AF_2, . . . , AF_N. Next, the process 1400 of some embodiments saves (at 1420) the default values, AF_1_DEF, AF_2_DEF, AF_N_DEF, to the local memory of the device DevA. In some embodiments, the process 1400 then includes a selection of languages (at 1430) to be used in translations of chosen fields from the fields AF_1, AF_2, . . . , AF_N. For example, PersonA may just use the DevA device to choose languages $L_1, L_2, \ldots, L_N$ for which translation, which would be entered into the chosen fields. After language selection, the process 1400 of some embodiments includes entering values for the chosen fields (at 1440). Specifically, the process 1400 enters (at 1440) a value for the chosen field for each language in $L_1$, $L_2, \ldots, L_N$. Each of these translations is then stored (at 1450) by the process 1400 to the device DevA's memory. In the next step, the process 1400 authenticates (at 1460) the person PersonA on a secure server. In order to be authenticated, PersonA logs in to the secure server. After authentication is completed, and PersonA is authorized, the process 1400 then sends (at 1470) the default values of contact fields to the secure server. Finally, the process 1400 sends to the secure server (at 1480) all of the translations for each language selected from languages $L_1, L_2, \ldots, L_N$. Then the process 1400 ends.

Turning to another example, FIGS. 15A and 15B conceptually illustrates a process 1500 for determining whether a translation exists on a remote server for a selected field and displaying the selected field in translation language when a translation exists or in the user-designated native language when the translation does not exist. The process 1500 may be implemented by a computer program that runs on a computing device.

The process 1500 starts when a user PersonB attempts to login. As shown in FIG. 15A, the process 1500 then authenticates (at 1505) PersonB on a secure remote server. The secure remote server (alternatively referred to as "secure server", "remote server", or "server" in this example) may store the contact information of several client users, including the contact information of PersonB, PersonA and other such users who have saved their contact information on the remote server.

Next, the process 1500 of some embodiments reads and retrieves (at 1510) the contacts in PersonB's contact book (or other contact storage) on device DevB. In other words, the process 1500 retrieves the contacts from the perspective of PersonB, whose contact book in the device DevB includes contacts identified as a list of items B_1, B_2, . . . , B_P. After the contacts are read, the mobile device, DevB, of PersonB will retrieve the default values of the contact fields and the corresponding translations. Then those default values and their corresponding translations will be stored in the memory of the device DevB.

The objective is for the device DevB to load, into memory, a complete matrix of contact fields and their translations. To complete this objective, the process 1500 of some embodiments uses counters to walk through all of the fields for all of the contacts. Thus, in some embodiments, the process 1500 sets (at 1515) a contact number counter 'i' to an initial value of one. The process 1500 also sets (at 1520) a field number counter 'j' to an initial value of one. In some embodiments, the process 1500 retrieves (at 1525) a default value FB_i_j_DEF from the secure server. Next, the retrieved default value FB_i_j_DEF is saved (at 1530) in a local memory of the device DevB.

Now turning to FIG. 15B, a continuation is shown of the process 1500 for determining whether a translation exists on a remote server for a selected field and displaying the selected field in translation language when a translation exists or in the user-designated native language when the translation does not exist.

In some embodiments, the process 1500 sets (at 1535) a language number counter 'K' to the initial value of one. Next, the process 1500 retrieves (at 1540) a translation FB_i_j_$L_K$ from the remote server (translation of FB_i_j_DEF to $L_K$). In some embodiments, the process 1500 then saves FB_i_j_$L_K$ in local memory of the device DevB. After saving the translation FB_i_j_$L_K$ in local memory of the device DevB, the process 1500 of some embodiments determines (at 1550) there are more language translations to retrieve. When the process 1500 negatively determines (at 1550) that there are no more language translations to retrieve for the contact field 'j' of contact 'i', then the process 1500 transitions to step 1560, which is described in greater detail below. On the other hand, when the process 1500 affirmatively determines (at 1550) that there are more language translations to retrieve for the contact field 'j' of contact 'i', then the process 1500 increments (at 1555) the value of 'K' (i.e., K=K+1). Then the process 1500 returns to step 1540 to retrieve the next language translation of FB_i_j_DEF (i.e., FB_i_j_$L_K$ because 'K' has already been incremented). The process 1500 of some embodiments repeats the steps 1540, 1545, 1550, and 1555 until all of the available language translations for FB_i_j_DEF (for contact field 'j' of contact 'i') have been processed, and then moves forward to step 1560, which is described next.

In some embodiments, the process 1500 determines (at 1560) whether there are any more contact fields associated with the present contact (e.g., contact 'i'). When the process 1500 negatively determines (at 1560) that there are no more contact fields associated with the present contact, then the process 1500 transitions to step 1570, which is described in greater detail below. On the other hand, when the process 1500 affirmatively determines (at 1560) that there are more contact fields associated with the present contact, then the process 1500 increments (at 1565) the value of 'j' (i.e., j=j+1). Then the process 1500 transitions back to step 1525, which is described above by reference to FIG. 15A, to begin processing of the next contact field associated with the present contact. The process 1500 of some embodiments repeats the steps 1525, 1530, 1535, 1540, 1545, 1550, 1555, 1560, and 1565 until all of the contact fields associated with the present contact are processed for all of the available language translations of FB_i_j_DEF. Then the process 1500 moves forward to step 1570, which is described next.

When the process 1500 completes processing for all of the contact fields of a given contact (e.g., contact 'i'), including the default values of the fields and their corresponding language translations, then the process 1500 repeats several of the above steps for another contact, if any more contacts from the set of contacts (B_1, B_2, . . . , B_P) remain unprocessed. Thus, the process 1500 of some embodiments determines (at 1570) whether there are any more contacts in the set of PersonB contacts (B_1, B_2, . . . , B_P) which have not yet been considered. When the process 1500 negatively determines (at 1570) that there are no more contacts left in PersonB's set of contacts, then the process 1500 transitions to step 1580, which is described in greater detail below. On the other hand, when the process 1500 affirmatively determines (at 1570) that there are more contacts in the set of PersonB contacts, then the process 1500 increments (at 1575) the value of 'i' (i.e., i=i+1). Then the process 1500 transitions back to step 1520, which is described above by reference to FIG. 15A, to begin processing of the next contact, starting with the first field (setting 'j' back to the initial value of one) associated with this next contact (e.g., now contact 'i' since 'i' was incremented). The process 1500 of some embodiments repeats the steps 1520, 1525, 1530, 1535, 1540, 1545, 1550, 1555, 1560, 1565, 1570, and 1575 until all PersonB contacts and all of the contact fields associated with each contact are processed for all of default contact field values and their corresponding language translations. Then the process 1500 moves forward to step 1580, which is described next.

After the process 1500 negatively determines (at 1570) that there are no more contacts left in PersonB's set of contacts, the process 1500 of some embodiments receives a user selection (at 1580) of a contact field to be displayed (e.g., PersonB chooses a contact field FB_i_j). As described above, the contact fields associated with any contact include default values based on the values of any user whose information was provided to the remote secure server to share with other users. Thus, PersonA inputs the default values for his or her own contact information while PersonB inputs the default values for his or her respective contact information. When the PersonA and PersonB contact information is transmitted to the secure server, PersonB may retrieve the PersonA contact information as a local contact for PersonB (and retrieve the PersonA contact details on device DevB) while PersonA may retrieve the PersonB contact information as a local contact for PersonA (on device DevA). Other users can also provide their own contact information and retrieve the contact information of other users who happen to be in their group of local contacts on their respective device(s). However, when the contact information of PersonA includes default values in a native language that is different from a native language that PersonB is most accustomed to using, then merely sharing the respective contact information of different users is problematic for many users. Thus, when an appropriate translation exists for default values of the contact fields from a particular contact whose native language is different from another language familiar to a user of a device with the contact information of the particular contact, the user would likely benefit from being able to incorporate the appropriate translation into the display of the particular contact's information.

Thus, in some embodiments, the process 1500 determines (at 1585) whether an appropriate translation exists for the contact field FB_i_j chosen by PersonB to be displayed. In some embodiments, a translation of the default value of a particular contact field (FB_i_j_$L_D$) is appropriate when the translation is associated with a default language ($L_D$) setting for the device employed by the user to display the contact field. For example, if PersonB has set the default language ($L_D$) of device DevB to Polish, but the contact field FB_i_j to be displayed (as chosen by PersonB) includes a default value in another language, such as English, then identifying and displaying a Polish translation of the default value, if such a translation exists, may be preferred by PersonB.

When the process 1500 negatively determines (at 1585) that an appropriate translation does not exist in relation to the default value FB_i_j_DEF of the chosen contact field, then the process 1500 displays (at 1590) the default value FB_i_j_DEF associated with the chosen contact field FB_i_j. On the other hand, when the process 1500 affirmatively determines (at 1585) that there is an appropriate translation FB_i_j_$L_D$ (e.g., in the default language of the device DevB used by PersonB in this example) of the default value FB_i_j_DEF of the chosen contact field, then the process 1500 displays (at 1590) the value of the contact field FB_i_j in the translation FB_i_j_$L_D$ language. After displaying the chosen contact field, either as a default value or in a translation of the default value if such translation exists, the process 1500 of some embodiments ends.

III. Contact Fields Grouping

Several individual processes related to grouping contact fields in various manners of visibility permissions with respect to other users are described next. Many of the individual processes are for adding contact fields and contact field groups, including public groups, exclusively shared groups, hidden fields, exclusive visible fields, etc. For instance, a user, PersonA, may want to set visibility permissions of the individual contact fields such that only select users can see some of the fields (shared), while every user can see some of the other fields (public).

By way of example, FIG. 16 conceptually illustrates a process 1600 for adding contact fields to contact field groups. The process 1600 shown in this figure demonstrates how a user can add a contact field to a contact field group, whether the contact field group is empty or includes existing contact fields. In this example, the user is PersonA, but a person skilled in the relevant art would appreciate that the user could be PersonB or another user.

In some embodiments, the process 1600 starts (at 1610) with a set of contact fields groups, GF_1 to GF_K. At the start, the contact fields groups are empty, denoted by GF_1=Ø, GF_2=Ø, . . . , GF_K=Ø. In some embodiments, the process 1600 initializes counters for the contact fields groups and the contact fields in associated with each contact fields group. Thus, the process 1600 of some embodiments sets (at 1620) a contact field number counter 'i' to the initial value of one. The process 1600 also sets (at 1630) a contact fields group number counter 'j' to one.

In some embodiments, the process 1600 then determines (at 1640) whether PersonA has decided to add contact field AF_i to contact fields group GF_j. When the process 1600 negatively determines (at 1640) that PersonA has not decided to add contact field AF_i to contact fields group GF_j, then the process 1600 transitions to step 1660, which is described in greater detail below. On the other hand, when the process 1600 affirmatively determines (at 1640) that PersonA has decided to add contact field AF_i to contact fields group GF_j, then the process 1600 adds (at 1650) the contact field AF_i to contact fields group GF_j (denoted by the union of the contact field, AF_i, and the set of contact fields, GF_j). Then the process 1600 proceeds to the next step at 1660, which is described next.

When the process 1600 negatively determines (at 1640) that PersonA has not decided to add contact field AF_i to contact fields group GF_j, then the process 1600 determines (at 1660) whether there are any more contact fields groups to consider for adding the contact field AF_i. When the process 1600 negatively determines (at 1660) that there are no more contact fields groups to consider for adding the contact field AF_i, then the process 1600 transitions to step 1680, which is described in greater detail below. On the other hand, when the process 1600 affirmatively determines (at 1660) that there are more contact fields groups to consider, then the process 1600 increments (at 1670) the contact fields group number counter 'j' (e.g., j=j+1). The process 1600 then returns to step 1640 to determine if PersonA decided to add the contact field AF_i to this (next incremented) contact fields group, GF_j. The process 1600 repeats the steps 1640, 1650 (conditionally), 1660, and 1670 until all of the contact fields groups GF_1 to GF_K have been considered.

However, when the process 1600 negatively determines (at 1660) that there are no more contact fields groups to consider for adding the contact field AF_i, then the process 1600 determines (at 1680) whether there are any more contact fields (among the contact fields AF_1 to AF_N) for which PersonA may possible decide to add to one or more of the contact fields groups, GF_1 to GF_K. When the process 1600 affirmatively determines (at 1680) that there are more contact fields which PersonA may decide to add to one or more of the contact fields groups, then the process 1600 increments (at 1690) the contact field number counter 'i' (e.g., i=i+1). The process 1600 then returns to step 1630 to re-initialize the contact fields group number counter 'j' to one, which is described in greater detail above. The process

1600 repeats the steps 1630, 1640, 1650 (conditionally), 1660, 1670, 1680, and 1690 until all of the contact fields AF_1 to AF_N have been evaluated for their possible inclusion into any of the contact fields groups, GF_1 to GF_K, according to PersonA's decisions about adding the contact field(s) to the contact fields group(s). When all of the contact fields AF_1 to AF_N have been evaluated in relation to possible inclusion in each of the contact fields groups GF_1 to GF_K, then the process 1600 ends.

Also, FIG. 17 conceptually illustrates a process 1700 for adding contact fields to contact field groups, from the perspective of PersonB. Specifically, the flow chart shown in FIG. 17 illustrates an exemplary way of adding contact fields of PersonB to the set of fields GF, as a result of which these fields are grouped into subsets of fields as described above by reference to FIG. 7.

Turning now to another process 1800 in some embodiments for adding contact fields to a set of public fields, as conceptually illustrated in FIG. 18. In some embodiments, the set of public fields includes contact fields which are visible to all users of the system. As shown in this figure, the set of public fields is denoted as PublicA. In some embodiments, process 1800 starts (at 1810) with the set of public fields PublicA being an empty set (i.e., PublicA=Ø). In some embodiments, the process 1800 sets (at 1820) a contact field number counter 'i' to the initial value of one.

Next, the process 1800 of some embodiments determines (at 1830) whether the user (PersonA in this example) has decided to set visibility permissions for contact field AF_i to be public. When the process 1800 negatively determines (at 1830) that PersonA has not decided to set the visibility permissions of contact field AF_i to public, then the process 1800 transitions to step 1850, which is described in greater detail below. On the other hand, when the process 1800 affirmatively determines (at 1830) that PersonA has decided to set the visibility permissions of contact field AF_i to public, then the process 1800 adds (at 1840) the contact field AF_i to the set of public contact fields, PublicA (denoted by the union of the contact field, AF_i, and the set of public contact fields, PublicA). Then the process 1800 proceeds to the next step at 1850, which is described next.

When the process 1800 negatively determines (at 1830) that PersonA has not decided to set the visibility permissions of contact field AF_i to public visibility, then the process 1800 determines (at 1850) whether there are any more contact fields to process for possible public visibility permissions (by adding to the set of public contact fields, PublicA). When the process 1800 affirmatively determines (at 1850) that there are more contact fields to process for possibly setting public visibility permissions, then the process 1800 increments (at 1860) the contact field number counter 'i' (e.g., i=i+1). Then the process 1800 transitions back to step 1830 to determine whether the contact field, AF_i, is to be set as a publicly visible contact field.

The process 1800 repeats the steps 1830, 1840 (conditionally), 1850, and 1860 until all of the contact fields have been processed for possible public visibility setting, according to PersonA's decisions about the visibility permissions of the contact fields. When all of the contact fields have been evaluated, then the process 1800 negatively determines (at 1850) that there are no more contact fields to process for possibly setting public visibility permissions and the process 1800 ends.

While process 1800 described by reference to FIG. 18 demonstrates how a user sets contact fields to be publicly visible for all users of the same system, in some embodiments it is possible to set limited sharing of contact fields with specific other users. By way of example, FIG. 19 conceptually illustrates a process 1900 for adding contact fields to a set of fields shared with a specific user. In this example, PersonA shares contact fields with PersonB. Assuming that the shared contact fields are not set as publicly visible and not shared with other users, the shared contact fields will be only visible to PersonA (the owner or originator of the contact fields) and PersonB (the other user).

Specifically, the process 1900 starts by setting (at 1910) a person number counter 'j' to the initial value of one. Next, the process 1900 identifies (at 1920) a contact, PersonB, based on the value of the person number counter 'j'. For example, PersonB is a contact from PersonA's contact book, such that PersonB is contact A_1 when 'j' is one, contact A_2 when 'j' is two, contact A_3 when 'j' is three, and so on for all the contact of PersonA. Next, the process 1900 initializes (at 1930) a set of contact fields shared with PersonB (i.e., SharedA_B=Ø). The process 1900 of some embodiments then sets (at 1940) a contact field number counter 'i' to the initial value of one.

In some embodiments, the process 1900 determines (at 1950) whether PersonA has decided to share field AF_i with PersonB. When the process 1900 negatively determines (at 1950) that PersonA has not decided to share field AF_i with PersonB, then the process 1900 transitions to step 1970 to determine if there are more contacts to consider, which is described in greater detail below. On the other hand, when the process 1900 affirmatively determines (at 1950) that PersonA has decided to share field AF_i with PersonB, then the process 1900 adds (at 1960) the contact field AF_i to SharedA_B (i.e., the set of contact fields shared with PersonB).

When the process 1900 negatively determines (at 1950) that PersonA has not decided to share field AF_i with PersonB, then the process 1900 determines (at 1970) whether there are any more contact fields to process for possible sharing with PersonB. When the process 1900 affirmatively determines (at 1970) that there are more contact fields to possibly share with PersonB, then the process 1900 increments (at 1980) the contact field number counter 'i' (e.g., i=i+1). Then the process 1900 transitions back to step 1950 to determine whether the contact field, AF_i, is to be shared with PersonB. The process 1900 repeats the steps 1950, 1960 (conditionally), 1970, and 1980 until all of the contact fields have been processed for possible sharing with PersonB.

When all of the contact fields have been evaluated, then the process 1900 negatively determines (at 1970) that there are no more contact fields to process for possible sharing with PersonB. In some embodiments, the process 1900 then increments (at 1990) the person number counter 'j' (e.g., j=j+1). Next, the process 1900 determines (at 1995) whether there are more contacts to consider for possible sharing of contact fields from PersonA. When there are more contacts, then the process 1900 transitions back to 1920 to set PersonB to the next contact, as incremented by 'j' (A_j). The process 1900 repeats the steps 1920, 1930, 1940, 1950, 1960 (conditionally), 1970, 1980, 1990, and 1995 until all of the contacts, A_j, have been processed for possible sharing contact fields of PersonA. Then the process 1900 ends.

The process 1800 described by reference to FIG. 18 and the process 1900 described by reference to FIG. 19 demonstrate how a user can make contact fields public or share contact fields with other select users (on a more limited basis than public visibility). However, some users may wish to hide certain contact fields. By way of example, FIG. 20 conceptually illustrates a process 2000 for adding contact fields to a set of hidden contact fields. In some embodiments, the process 2000 adds contact fields to the set of hidden contact fields in relation to individual users, such that the hidden fields in a set are invisible to a particular user, but not necessarily hidden from view of other users. In this example, PersonA hides contact fields from the view of PersonB.

As shown in this figure, the process 2000 starts by setting (at 2010) a person number counter 'j' to the initial value of one. Next, the process 2000 identifies (at 2020) a contact, PersonB, based on the value of the person number counter 'j'. Next, the process 2000 initializes (at 2030) a set of contact fields hidden from PersonB (i.e., HiddenA_B=Ø). The process 2000 of some embodiments then sets (at 2040) a contact field number counter 'i' to the initial value of one.

In some embodiments, the process 2000 determines (at 2050) whether PersonA has decided to hide field AF_i from PersonB. When the process 2000 negatively determines (at 2050) that PersonA has not decided to hide field AF_i from PersonB, then the process 2000 transitions to step 2070 to determine if there are more contacts to consider, which is described in greater detail below. On the other hand, when the process 2000 affirmatively determines (at 2050) that PersonA has decided to hide field AF_i from PersonB, then the process 2000 adds (at 2060) the contact field AF_i to HiddenA_B (i.e., the set of contact fields hidden from PersonB) and removes the contact field AF_i from SharedA_B (i.e., the set of shared contact fields with PersonB).

When the process 2000 negatively determines (at 2050) that PersonA has not decided to hide field AF_i from PersonB, then the process 2000 determines (at 2070) whether there are any more contact fields to process for possible hiding from PersonB. When the process 2000 affirmatively determines (at 2070) that there are more contact fields to possibly hide from PersonB, then the process 2000 increments (at 2080) the contact field number counter 'i' (e.g., i=i+1). Then the process 2000 transitions back to step 2050 to determine whether the contact field, AF_i, is to be hidden from PersonB. The process 2000 repeats the steps 2050, 2060 (conditionally), 2070, and 2080 until all of the contact fields have been processed for the possible hiding from PersonB.

When all of the contact fields have been evaluated, then the process 2000 negatively determines (at 2070) that there are no more contact fields to process for possible hiding from PersonB. In some embodiments, the process 2000 then increments (at 2090) the person number counter 'j' (e.g., j=j+1). Next, the process 2000 determines (at 2095) whether there are more contacts to consider for the possible hiding of contact fields. When there are more contacts, then the process 2000 transitions back to 2020 to set PersonB to the next contact, as incremented by 'j' (A_j). The process 2000 repeats the steps 2020, 2030, 2040, 2050, 2060 (conditionally), 2070, 2080, 2090, and 2095 until all of the contacts, A_j, have been processed for possible hiding of contact fields. Then the process 2000 ends.

In another example of adding contact fields to groups, FIG. 21 conceptually illustrates a process 2100 for identifying contact fields and contacts which are both in groups of PersonA. In some embodiments, the process 2100 adds contact fields to a set of contact fields visible to a specific person (PersonB) when that person (PersonB) is affiliated with one of the contact groups of PersonA. Specifically, the process 2100 starts by setting (at 2110) a person number counter 'j' to the initial value of one. Next, the process 2100 identifies (at 2120) a contact, PersonB, based on the value of the person number counter 'j'. Next, the process 2100 initializes (at 2130) a set of contact fields visible to PersonB (i.e., InGroupA_B=Ø). The process 2100 of some embodiments then sets (at 2140) a contact field number counter 'i' to the initial value of one.

In some embodiments, the process 2100 determines (at 2150) whether there exists a value 'K' such that AF_i is an element of the contact fields group GF_K and PersonB is an element of contacts group GC_K. When the process 2100 negatively determines (at 2150) that there does not exist a value 'K' such that AF_i is an element of the contact fields group GF_K and PersonB is an element of contacts group GC_K, then the process 2100 transitions to step 2170 to determine if there are more contacts to consider, which is described in greater detail below. On the other hand, when the process 2100 affirmatively determines (at 2150) that there does exist a value 'K' such that AF_i is an element of the contact fields group GF_K and PersonB is an element of contacts group GC_K, then the process 2100 adds (at 2160) the contact field AF_i to InGroupA_B. This is denoted by the union of the contact field, AF_i, and the set of contact fields visible to PersonB, namely InGroupA_B (e.g., InGroupA_B=InGroupA_B☐{AF_i}).

When the process 2100 negatively determines (at 2150) that there does not exist a value 'K' such that AF_i is an element of the contact fields group GF_K and PersonB is an element of contacts group GC_K, then the process 2100 determines (at 2170) whether there are any more contact fields to process. When the process 2100 affirmatively determines (at 2170) that there are more contact fields, then the process 2100 increments (at 2180) the contact field number counter 'i' (e.g., i=i+1). Then the process 2100 transitions back to step 2150, which is described above. The process 2100 repeats the steps 2150, 2160 (conditionally), 2170, and 2180 until all of the contact fields have been processed.

When all of the contact fields have been evaluated, then the process 2100 negatively determines (at 2170) that there are no more contact fields to evaluate. In some embodiments, the process 2100 then increments (at 2190) the person number counter 'j' (e.g., j=j+1). Next, the process 2100 determines (at 2195) whether there are more PersonA contacts to consider. When there are more contacts, then the process 2100 transitions back to 2120 to set PersonB to the next contact, as incremented by 'j' (A_j). The process 2100 repeats the steps 2120, 2130, 2140, 2150, 2160 (conditionally), 2170, 2180, 2190, and 2195 until all of the contacts, A_j, have been processed. Then the process 2100 ends.

IV. Processes for Providing and Retrieving Contact Details

Several additional processes are described by reference to FIGS. 22 to 24. In particular, FIG. 22 conceptually illustrates a process 2200 for sending contact fields groups from a mobile device DevA of PersonA to a remote secure server. As shown in this figure, the process 2200 starts by sending PublicA to the server. As shown in this figure, and as described above by reference to FIG. 18, PublicA denotes a set of public contact fields as designated by PersonA. The set of public contact fields includes contact fields which are visible to all users of the system. While a typical case involves updates by PersonA to the set of public contact fields, PublicA, and those updates are to be transmitted to the server, there are other scenarios handled by the process 2200. For example, the set of public contact fields may have been newly created and populated with contact fields entirely on mobile device DevA or merely updated with the addition to or removal from an existing set of public contact fields (PublicA) about which the server already has a reference with out of date information. Alternatively, the set of public contact fields could be a newly created empty set (e.g., PublicA=Ø) which is being transmitted to the secure for the first time from the mobile device DevA on behalf of PersonA. For instance, if PersonA has created a new account on the secure server, it is possible that PersonA simply does not have any public contact fields, but that a set of public contact fields is generated when the account is created. Whatever the status of PublicA in terms of contact fields set to be publicly visible, the process 2200 sends (at 2210) PublicA to the server.

After sending PublicA to the server, the process 2200 of some embodiments sets (at 2220) a contact number counter 'j' to the initial value of one. Next, the process 2200 identifies (at 2230) a contact, PersonB, based on the value of the person number counter 'j'. The contact PersonB is identified as one contact (e.g., A_j) in a set of contacts in the contact book of PersonA on the mobile device DevA. As described above by reference to FIG. 1, for example, the contact PersonB is identified as a contact A_j in the set of contacts 118 including contacts 'A_1' 112, 'A_2' 114, . . . , 'A_M' 116 on device DevA 110.

After contact PersonB is identified, the process 2200 of some embodiments sends (at 2240) the groups associated with PersonB to the secure server. In particular, the groups associated with PersonB include SharedA_B, HiddenA_B, and InGroupA_B. Unlike the set of public contact fields, PublicA, which is a universal group for all contacts of PersonA, the groups SharedA_B, HiddenA_B, and InGroupA_B are defined in relation to PersonB's association with these groups. Thus, for each contact, A_j, the process 2200 would send the groups SharedA_B, HiddenA_B, and InGroupA_B in relation to the present PersonB contact being processed (depending on the present value of the contact number counter 'j').

After sending the groups SharedA_B, HiddenA_B, and InGroupA_B associated with PersonB to the remote server, the process 2200 of some embodiments determines (at 2250) whether there are more contacts in PersonA's set of contacts on the mobile device DevA. When there are more contacts, the process 2200 increments (at 2260) the contact number counter 'j' (e.g., j=j+1), and transitions back to step 2230 to identify the next contact, PersonB, based on the value of the contact number counter 'j' (e.g., PersonB=A_j). When there are no more contacts, the process 2200 ends.

Now in another example, an overall process for managing contact groups in a contact book in a device and managing contact fields that describe the owner of that device is briefly summarized now. Specifically, the process for managing contact groups in a contact book in a device and managing contact fields that describe the owner of that device includes steps in which (i) contact items from PersonA's contact book are assigned to the groups of contacts, (ii) contact fields of PersonA are assigned to the appropriate groups of fields, (iii) selected fields are then added to the set of public fields, (iv) certain contact fields may be added to the set of shared fields, with (v) some fields selected by PersonA being added to the set of hidden fields, and a last step for the system to (vi) calculate a set of fields that belong to the corresponding groups of fields and contacts, after which (vii) PersonA provides login credentials for the process to authenticate in order to access the server, and then (viii) all of the contact details are sent to the server. As a person skilled in the relevant art would appreciate, this brief summary of the steps is a non-limiting example of the steps in which the process for managing contact groups in a contact book of a device can be performed. Other steps or orders of the steps could be present in a process for managing contact groups in a contact book of a device without changing the essential function of the process.

By way of example, FIG. 23 conceptually illustrates an overall process 2300 for managing contact groups in a contact book in a device DevA and managing contact fields that describe the owner of that device (PersonA). In some embodiments, the overall process 2300 manages the contact fields in relation to DevA connecting to a remote secure server to add (or update) values and content of the contact fields and set the visibility of the contact fields for other users on the server.

In some embodiments, the overall process 2300 starts by adding (at 2310) contacts to contact groups. For example, the overall process 2300 may add one or more contacts, A_i (the contact identified by the contact number counter 'i'), to one or more contact groups, GC_j (the contact group identified by the contact group number counter 'j'). Adding contacts to contact groups is described in detail above by reference to FIGS. 3 and 4.

In some embodiments, the overall process 2300 then adds (at 2320) contact fields to contact fields groups. For example, the overall process 2300 may add one or more contact fields, AF_i (the contact field identified by the contact field number counter 'i'), to one or more contact fields groups, GF_j (the contact fields group identified by the contact fields group number counter 'j'). Adding contact fields to contact fields groups is described in detail above by reference to FIGS. 16 and 17.

Next, the overall process 2300 of some embodiments adds (at 2330) contact fields to a set of public contact fields. For example, PersonA may allow public visibility of PersonA's basic information (e.g., first name and surname) and quick contact information (e.g., first name and e-mail) by simply adding the corresponding contact fields to the set of public contact fields, PublicA. Adding contact fields to a set of public contact fields is described in detail above by reference to FIG. 18.

In some embodiments, the overall process 2300 then adds (at 2340) contact fields to the sets of shared contact fields. For example, the overall process 2300 may add contact fields to SharedA_B (the set of shared contact fields which PersonA shares with PersonB) for each contact (e.g., A_1, A_2, . . . , A_M) of PersonA of the device DevA. Adding contact fields to sets of shared contact fields is described in detail above by reference to FIG. 19.

In some embodiments, the overall process 2300 then adds (at 2350) contact fields to the sets of hidden contact fields. For example, the overall process 2300 may add contact fields to HiddenA_B when PersonA does not want PersonB to be able to see the contact information associated with the hidden contact fields (even when the contact fields to be hidden are elements of the set of public contact fields, PublicA). Adding contact fields to sets of hidden contact fields is described in detail above by reference to FIG. 20.

In some embodiments, the overall process 2300 then designates (at 2360) contact fields that are visible to another user. For example, PersonA may designate several contact fields as visible to PersonB by adding the contact files to an InGroupA_B set of such designated contact fields. Designating contact fields as visible to PersonB is described in detail above by reference to FIG. 21.

In some embodiments, the overall process 2300 then authenticates (at 2370) a user of a device on the remote secure server. For example, PersonA may use device DevA to access the remote secure server, which upon logon by PersonA, the process authenticates, in order to synchronize local contacts on the device DevA with updates to contacts made by other users and to update the server with updated contact information on the device DevA.

In some embodiments, the overall process 2300 then sends (at 2380) subsequent contact fields groups to the remote secure server. For example, PersonA may have several subsequent contact fields groups on device DevA to transmit to the server, as updated, created new, etc., including content of each contact field and contact fields group adding at steps 2310, 2320, 2330, 2340, 2350, and 2360 of the overall process 2300. Sending subsequent contact fields groups to the server is described in detail above by reference to FIG. 22. After sending the subsequent contact fields groups, the overall process 2300 of some embodiments ends.

Turning to another example, FIG. 24 conceptually illustrates a contact details retrieving process 2400 in some embodiments for managing the groups of contacts from the perspective of a retrieving device (in this example, the device DevB) versus the adding and updating device DevA described by reference to FIG. 23, above. The contact details retrieving process 2400 manages contact details by downloading the content of each group of contact fields and storing them locally in the local memory of the device DevB. Furthermore, FIG. 24 illustrates an exemplary embodiment for displaying these fields by the user (PersonB) of the device DevB and an exemplary embodiment for downloading the content of the content fields of another user (PersonA) from the remote secure server to the device DevB (for the benefit of PersonB) and based on belonging to particular groups, recording these fields in memory of the device DevB (again, for the benefit of PersonB).

As shown in this figure, the contact details retrieving process 2400 starts by setting (at 2410) a contact number counter 'i' to the initial value of one. Next, the contact details retrieving process 2400 identifies (at 2420) a contact, PersonA, based on the value of the contact number counter 'i'. Next, the process 2400 retrieves (at 2430) several contact fields groups from the remote secure server. The several contact fields groups retrieved include PublicA (e.g., the set of public contact fields designated by PersonA), SharedA_B (e.g., the set of contact fields shared by PersonA with PersonB), HiddenA_B (e.g., the set of contact fields hidden by PersonA against PersonB), and InGroupA_B (e.g., the set of contact fields visible to PersonB).

In some embodiments, the contact details retrieving process 2400 then sets (at 2440) a full contact fields group (denoted as FieldsA) from the union of the set of public contact fields PublicA, the set of contact fields shared by PersonA with PersonB (SharedA_B), and the combination of the set of contact fields visible to PersonB (InGroupA_B) with removal of the set of contact fields hidden by PersonA against PersonB (HiddenA_B). Next, the contact details retrieving process 2400 saves (at 2450) the full contact fields group, FieldsA, in the local memory of device DevB.

In some embodiments, the contact details retrieving process 2400 then determines (at 2460) whether there are more contacts to retrieve contact details (the next 'PersonA'). When there are more contacts, the contact details retrieving process 2400 increments (at 2470) the contact number counter 'i' to the next value (e.g., i=i+1). Then the contact details retrieving process 2400 transitions back to step 2420 to identify the next contact based on the incremented value of the contact number counter 'i' (e.g., PersonA=B_i). On the other hand, when there are no more contacts, the contact details retrieving process 2400 then ends.

V. Cumulative Contact Information Organizing, Synchronizing, and Sharing System

The cumulative contact information organizing, synchronizing, and sharing system and the method for organizing, synchronizing, and sharing cumulative contact information of the present disclosure may be comprised of the following elements. This list of possible constituent elements is intended to be exemplary only and it is not intended that this list be used to limit the system and the method of the present application to just these elements. Persons having ordinary skill in the art relevant to the present disclosure may understand there to be equivalent elements that may be substituted within the present disclosure without changing the essential function or operation of the system and the method.

1. Development of background core services which includes one or more databases on the server side.

2. Development of applications to be used on the client side.

The various elements of the cumulative contact information organizing, synchronizing, and sharing system and the method for organizing, synchronizing, and sharing cumulative contact information of the present disclosure may be related in a cloud-network framework that includes a server side and a client side. It is not intended to limit the scope or nature of the relationships between the various elements and the following examples are presented as illustrative examples only. Specifically, on the server side, step one (1) takes care of global relations/operations, this is where the data entered by the user is uploaded, and from here the updated data is pushed to the client (e.g., a client computing device). Then, on the client side, step two (2) synchronizes with native contact books across different platforms (iOS, Android, Windows, Mac, and Web).

Then each user's updated information is seamlessly uploaded to the servers and as a result, the updated information is automatically updated in everyone's (only with those users with whom contact information was initially shared) contact/phone book app.

In contrast, the currently available solutions for contact management are actually counter-logical, because each user has to manually update contact information for every single contact he has in his phone book, email, social media, etc.

The cumulative contact information organizing, synchronizing, and sharing system and the method for organizing, synchronizing, and sharing cumulative contact information of the present disclosure generally work by following the steps above. Specifically, the user's contacts (e.g., in a contact book of a phone of the user) will be constantly updated with any and all changes made. Thus, the cumulative contact information organizing, synchronizing, and sharing system and the method for organizing, synchronizing, and sharing cumulative contact information complete the operations automatically without the need to manually update/change any field of contact information.

To make the cumulative contact information organizing, synchronizing, and sharing system and the method for organizing, synchronizing, and sharing cumulative contact information of the present disclosure, a person would design and developer software applications that can run on client computing devices and a cloud-based server computer, such that a user with a personal ID can be linked with Corporate IDs and assigned to him by organizations (e.g., companies, universities, etc.). Then users contact profile will get contact information from Corporate IDs (name of company, position etc.), while corporate IDs will get the personal information (home address, DOB, phones etc.).

By way of example, FIG. 25 conceptually illustrates a network architecture of a cumulative contact information organizing, synchronizing, and sharing system 2500 that hosts a cloud-based cumulative contact information platform as a service (PaaS) for organizing, synchronizing, and sharing contact information regardless of language and with ability to define customized permissions to associate with one or more users who can access the contact information. As shown in this figure, the cumulative contact information organizing, synchronizing, and sharing system 2500 includes a set of client computing devices 2510-2540, a wireless communication point 2522 (e.g., a cell tower for cellular data communication), a gateway 2524, a set of cumulative contact information PaaS server computing devices 2550, a contact user database 2560, a set of private cumulative contact information organizing, synchronizing, and sharing servers 2570 (LOB servers, or line-of-business servers), a default value translations database 2580 that stores language translations of default values entered into contact fields by users of the cumulative contact information organizing, synchronizing, and sharing system 2500, and a contact details database 2590.

The set of client computing devices 2510-2540 connect over the Internet to the set of cumulative contact information PaaS server computing devices 2550 in relation to contact details with which users of the client computing devices 2510-2540 would like to make available to other users, retrieve other users' contact details, enter default contact values in relation to one or more contact fields, define one or more language translations for default contacts values, and/or define custom permissions for the visibility of their contact details. Unlike the client computing devices 2520-2540, which connect to the set of cumulative contact information PaaS server computing devices 2550 directly over the Internet, client computing device 2510 connects to the set of cumulative contact information PaaS server computing devices 2550 by way of a wireless connection to the wireless communication point 2522 and through the gateway 2524, finally connecting over the Internet to the set of cumulative contact information PaaS server computing devices 2550.

While many of the embodiments, examples, and details provided above relate to personal contact information, in some embodiments, the cumulative contact information organizing, synchronizing, and sharing system and the method for organizing, synchronizing, and sharing cumulative contact information can be adapted for use in different fields such are authorization, HR management, people search, etc. Furthermore, in some embodiments, the cumulative contact information organizing, synchronizing, and sharing system and the method for organizing, synchronizing, and sharing cumulative contact information can create and/or support a variety of services that may be linked to the cumulative contact information organizing, synchronizing, and sharing system, such as sign in authorization, electronic wallets, etc.

Thus, the above-described embodiments of the invention are presented for purposes of illustration and not of limitation. While these embodiments of the invention have been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

VI. Electronic System

Many of the above-described features and applications are implemented as software processes that are specified as a set of instructions recorded on a computer readable storage medium (also referred to as computer readable medium or machine readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

FIG. 26 conceptually illustrates an electronic system 2600 with which some embodiments of the invention are implemented. The electronic system 2600 may be a computer, phone, PDA, or any other sort of electronic device. Such an electronic system includes various types of computer readable media and interfaces for various other types of computer readable media. Electronic system 2600 includes a bus 2605, processing unit(s) 2610, a system memory 2615, a read-only 2620, a permanent storage device 2625, input devices 2630, output devices 2635, and a network 2640.

The bus 2605 collectively represents all system, peripheral, and chipset buses that communicatively connect the numerous internal devices of the electronic system 2600. For instance, the bus 2605 communicatively connects the processing unit(s) 2610 with the read-only 2620, the system memory 2615, and the permanent storage device 2625.

From these various memory units, the processing unit(s) 2610 retrieves instructions to execute and data to process in order to execute the processes of the invention. The processing unit(s) may be a single processor or a multi-core processor in different embodiments.

The read-only-memory (ROM) 2620 stores static data and instructions that are needed by the processing unit(s) 2610 and other modules of the electronic system. The permanent storage device 2625, on the other hand, is a read-and-write memory device. This device is a non-volatile memory unit that stores instructions and data even when the electronic system 2600 is off. Some embodiments of the invention use a mass-storage device (such as a magnetic or optical disk and its corresponding disk drive) as the permanent storage device 2625.

Other embodiments use a removable storage device (such as a floppy disk or a flash drive) as the permanent storage device 2625. Like the permanent storage device 2625, the system memory 2615 is a read-and-write memory device. However, unlike storage device 2625, the system memory 2615 is a volatile read-and-write memory, such as a random access memory. The system memory 2615 stores some of the instructions and data that the processor needs at runtime. In some embodiments, the invention's processes are stored in the system memory 2615, the permanent storage device 2625, and/or the read-only 2620. For example, the various memory units include instructions for processing appearance alterations of displayable characters in accordance with some embodiments. From these various memory units, the processing unit(s) 2610 retrieves instructions to execute and data to process in order to execute the processes of some embodiments.

The bus 2605 also connects to the input and output devices 2630 and 2635. The input devices enable the user to communicate information and select commands to the electronic system. The input devices 2630 include alphanumeric keyboards and pointing devices (also called "cursor control devices"). The output devices 2635 display images generated by the electronic system 2600. The output devices 2635 include printers and display devices, such as cathode ray tubes (CRT) or liquid crystal displays (LCD). Some embodiments include devices such as a touchscreen that functions as both input and output devices.

Finally, as shown in FIG. 26, bus 2605 also couples electronic system 2600 to a network 2640 through a network adapter (not shown). In this manner, the computer can be a part of a network of computers (such as a local area network ("LAN"), a wide area network ("WAN"), or an intranet), or a network of networks (such as the Internet). Any or all components of electronic system 2600 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes may be performed by one or more programmable processors and by one or more set of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the invention has been described with reference to numerous specific details, one of ordinary skill in the art will recognize that the invention can be embodied in other specific forms without departing from the spirit of the invention. For instance, FIGS. 14-24 conceptually illustrate processes. The specific operations of these processes may not be performed in the exact order shown and described. Specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

I claim:

1. A non-transitory computer readable medium storing a cumulative contact information management program which, when executed by a processor of a computing device, organizes, synchronizes, and shares contact details of a user between electronic mobile devices, said cumulative contact information management program comprising sets of instructions for:

authenticating a first electronic mobile device of a first mobile device user on a secure cumulative contact information server that stores and distributes contact information of the first mobile device user and a second mobile device user in a contact user database;

performing bilateral contact information exchange between the secure cumulative contact information server that stores the contact information of the first mobile device user and the second mobile device user in the contact user database and each of (i) a first contact book on the first electronic mobile device of the first mobile device user and (ii) a second contact book on a second electronic mobile device used by the second mobile device user;

retrieving a first set of user contacts from the first contact book on the first electronic mobile device of the first mobile device user;

retrieving a first set of default and language translation contact information of each contact in the first set of user contacts, wherein the first set of default and language translation contact information comprises first default values of contact fields and corresponding translations;

retrieving a second set of user contacts from the second contact book on the second electronic mobile device of the second mobile device user;

retrieving a second set of default and language translation contact information of each contact in the second set of user contacts, wherein the second set of default and language translation contact information comprises second default values of contact fields and corresponding translations;

converting selected contact fields of the contact information of the first mobile device user using the first electronic mobile device into a particular first language consistent with the preferences of the first mobile device user;

using a counter to determine a complete number of contact fields of the contact information of contacts in the first contact book of the first mobile device user using the first electronic mobile device, wherein the complete number of contact fields and the corresponding language translations of the contact fields form a complete matrix of contact fields that is loaded into memory of the first electronic mobile device of the first mobile device user;

selecting a specific number of contact fields and describing each of the synchronized contact items, wherein the specific number of contact fields is one of less than the complete number of contact fields and equal to the complete number of contact fields; and defining subsets of contact fields of contact information of contacts to assign different kinds of attributes to the defined subsets of contact fields of contact information of contacts.

2. The non-transitory computer readable medium of claim 1, wherein the first mobile device user defines a set of contact fields of the contact information having the translation into languages other than the default language of the first electronic mobile device of the first mobile device user, wherein the user defined set of contact fields of the contact information comprises content of the contact information defined by the first mobile device user.

3. The non-transitory computer readable medium of claim 1, wherein the first mobile device user defines an unlimited number of translations of the content of the contact fields selected by the first mobile device user and translated into languages selected by the first mobile device user.

4. The non-transitory computer readable medium of claim 1, wherein the first mobile device user who defines the content of the contact fields, chooses the fields which are given the public status for universal visibility across all users.

5. The non-transitory computer readable medium of claim 1, wherein the first mobile device user who defines the content of the contact fields defines subsets of fields, which are given the status of visibility to other specific users.

6. The non-transitory computer readable medium of claim 1, wherein the first mobile device user who defines the content of the contact fields defines subsets of fields, which are given the status of one of visibility and invisibility to other specific users of the system, wherein the status of invisibility hides the contact fields from visibility by the other specific users.

7. The non-transitory computer readable medium of claim 1, wherein the first mobile device user who defines the content of the contact fields defines subsets of fields, which are given the status of visibility to the groups of users chosen by the first mobile device user, wherein each user can select any contact field of contact information to synchronize with by way of a unique ID of the contact field.

8. The non-transitory computer readable medium of claim 1, wherein the first mobile device user who defines transliterations of the content of the contact fields defines subsets of fields, which are given the status of visibility to the groups of users chosen by the first mobile device user, wherein each user can select any contact field of contact information to synchronize with by way of a unique ID of the contact field.

9. The non-transitory computer readable medium of claim 1, wherein the first mobile device user defines a pronunciation of the content of the contact fields and uploads an audio file that includes an audible pronunciation of the content of the contact fields, wherein the audio file that includes that audible pronunciation is available when the contact fields are given the status of visibility to other specific users.

10. The non-transitory computer readable medium of claim 1, wherein the first mobile device user joins a first contact ID with a second contact ID, wherein the first contact ID and the second contact ID relate to the same person.

* * * * *